US010387938B2

(12) United States Patent
Miller et al.

(10) Patent No.: US 10,387,938 B2
(45) Date of Patent: Aug. 20, 2019

(54) AUTOMATED COLOR PROCESSING AND SELECTION PLATFORM

(71) Applicant: Stylyze LLC, Sammamish, WA (US)

(72) Inventors: Kristen A. Miller, Sammamish, WA (US); Teresa D Marcel, Lake Oswego, OR (US); James D McManis, Bellevue, WA (US); Maureen Daniek, Bellevue, WA (US); Laurie Ruegamer, Scottsdale, AZ (US); Jon Collette, Sammamish, WA (US); Lisa Perrone, Mercer Island, WA (US); Joe Cincotta, Sydney (AU); Jeffrey Patton, Lake Forest Park, WA (US)

(73) Assignee: STYLYZE LLC, Sammamish, WA (US)

( * ) Notice: Subject to any disclaimer, the term of this patent is extended or adjusted under 35 U.S.C. 154(b) by 0 days.

(21) Appl. No.: 14/700,572

(22) Filed: Apr. 30, 2015

(65) Prior Publication Data

US 2015/0235389 A1  Aug. 20, 2015

Related U.S. Application Data

(63) Continuation of application No. PCT/US2013/067550, filed on Oct. 30, 2013, and a
(Continued)

(51) Int. Cl.
*G06Q 30/06* (2012.01)

(52) U.S. Cl.
CPC ..... *G06Q 30/0627* (2013.01); *G06Q 30/0643* (2013.01)

(58) Field of Classification Search
None
See application file for complete search history.

(56) References Cited

U.S. PATENT DOCUMENTS 8,576,241 B1 * 11/2013 Kanter ................ G06K 9/4652
345/589
2002/0080153 A1 * 6/2002 Zhao ..................... H04N 1/644
715/700
(Continued)

FOREIGN PATENT DOCUMENTS

EP           1152322 A1    11/2001
JP        2011249947 A    12/2011
(Continued)

OTHER PUBLICATIONS

International Search Report for International Application No. PCT/US2013/067550 dated Feb. 14, 2014, 1 page.

*Primary Examiner* — Hilina K Demeter
(74) *Attorney, Agent, or Firm* — Cantor Colburn LLP

(57) ABSTRACT

A color selection system is described herein that provides a facility for customers to receive color selection assistance for color-related buying decisions. The system divides color space into harmonious groups based on hue, chroma, and saturation whereby every major hue family is represented in each color group. This ensures that complete harmonious palettes can be created to align with every user's color and product preferences, across all brands and product classes. The system also provides software for uploading digital images to profile particular products for color information. This assigns a harmonious color palette to each image. The system also enables product images to be profiled into the system so that users can find products that match their color preferences. The system provides a search facility that enables users to find colors, products, and styleboards that match their design concept, or dynamically build their design concept through their search queries.

14 Claims, 16 Drawing Sheets

Related U.S. Application Data continuation of application No. 14/067,610, filed on Oct. 30, 2013, now abandoned.

(60) Provisional application No. 61/720,088, filed on Oct. 30, 2012.

(56) References Cited

U.S. PATENT DOCUMENTS

| | | | | |
|---|---|---|---|---|
| 2002/0130884 A1* | 9/2002 | Rose | | G09G 5/02 |
| | | | | 345/594 |
| 2003/0011612 A1* | 1/2003 | Luo | | H04N 1/644 |
| | | | | 345/589 |
| 2006/0023082 A1* | 2/2006 | Higuchi | | H04N 5/772 |
| | | | | 348/231.6 |
| 2007/0076013 A1* | 4/2007 | Campbell | | G09G 5/06 |
| | | | | 345/589 |
| 2007/0100786 A1* | 5/2007 | Moroney | | G06K 9/6218 |
| 2008/0046410 A1* | 2/2008 | Lieb | | G06F 16/5838 |
| 2008/0162305 A1* | 7/2008 | Rousso | | G06Q 10/0631 |
| | | | | 705/26.5 |
| 2008/0208793 A1* | 8/2008 | Lee | | G06F 16/5854 |
| 2009/0041345 A1* | 2/2009 | Tirumalareddy | ... | G06F 16/5838 |
| | | | | 382/165 |
| 2009/0210182 A1* | 8/2009 | McGinley | | B44D 3/003 |
| | | | | 702/81 |
| 2010/0053201 A1* | 3/2010 | Klassen | | G06T 11/001 |
| | | | | 345/601 |
| 2010/0194775 A1* | 8/2010 | Ou | | G01J 3/46 |
| | | | | 345/594 |
| 2010/0194776 A1* | 8/2010 | Chong | | G01J 3/528 |
| | | | | 345/594 |
| 2011/0029401 A1* | 2/2011 | Granger | | G06Q 30/00 |
| | | | | 705/26.4 |
| 2011/0149307 A1* | 6/2011 | Tin | | H04N 1/6033 |
| | | | | 358/1.9 |
| 2011/0313927 A1* | 12/2011 | Savilia | | G06Q 30/02 |
| | | | | 705/50 |
| 2012/0045121 A1* | 2/2012 | Youngman | | G06Q 30/0601 |
| | | | | 382/162 |
| 2012/0075329 A1* | 3/2012 | Skaff | | G09G 5/06 |
| | | | | 345/593 |
| 2012/0224768 A1* | 9/2012 | Lee | | G06F 16/5838 |
| | | | | 382/165 |
| 2013/0050238 A1* | 2/2013 | Bergou | | H04N 1/62 |
| | | | | 345/589 |

FOREIGN PATENT DOCUMENTS

| | | |
|---|---|---|
| KR | 20080040925 A | 5/2008 |
| WO | 2008045418 A1 | 4/2008 |

\* cited by examiner

US 10,387,938 B2

AUTOMATED COLOR PROCESSING AND SELECTION PLATFORM

CROSS-REFERENCE TO RELATED APPLICATIONS

The present application is a continuation of PCT Application No. PCT/US2013/067550 entitled "AUTOMATED COLOR PROCESSING AND SELECTION PLATFORM," and filed on 2013 Oct. 30, which claims the benefit of U.S. Patent Application No. 61/720,088 entitled "AUTOMATED COLOR PROCESSING AND SELECTION PLATFORM," and filed on 2012 Oct. 30, each of which is hereby incorporated by reference.

The present application is also a continuation of U.S. application Ser. No. 14/067,610 entitled "AUTOMATED COLOR PROCESSING AND SELECTION PLATFORM," and filed on 2013 Oct. 30, which claims the benefit of U.S. Patent Application No. 61/720,088 entitled "AUTOMATED COLOR PROCESSING AND SELECTION PLATFORM," and filed on 2012 Oct. 30, each of which is hereby incorporated by reference.

BACKGROUND

Color has a significant impact on our life experience. It influences nearly all of our buying decisions and affects our mood and emotional state. People are often in situations where they are choosing products based on color, such as choosing paint colors for a room, choosing decorative items for a home or office, buying clothes, and so forth. Despite the significant impact that color has on all of our experiences, many people feel overwhelmed by color-related buying decisions and rightly so. There are millions of colors, and a nearly infinite number of combinations that can be created with those colors. In this sea of color, it is difficult for a person to define which colors he or she is drawn to or to select a palette of colors that coordinate with one another.

Both brick-and-mortar and online retailers are trying to find ways to help customers make color-related buying decisions, particularly in industries such as home décor and fashion where color is one of the top buying considerations. The challenge is that there is no coherence between the colors or selection processes of various retailers, so if a customer is remodeling the customer's house he or she would need to choose from a unique set of colors and utilize different color selection "tools" for every retailer from which the customer purchases. This slows down the decision-making process for the customer and lowers the retailers' average sale and closing rate.

Past attempts to solve these problems typically include some variation of applying traditional color theory to select coordinating colors (e.g., from a color wheel). This process is finite, leading to only a small subset of locked color variations, and fails to take into account more subtle nuances of color, such as hue, chroma, saturation, and so forth. In addition, such systems typically ask the user to identify a small set of colors with which the user wants to coordinate, but life is rich in color, and it can be difficult for the user to know which set of colors to choose. For example, a simple couch may have dozens of colors in its fabric, and if the user is trying to coordinate with this or another item, the user may be unskilled at the task of identifying the main colors evoked by an item. In addition, such systems do not provide any level of shared knowledge. In other words, users cannot view results that other users have produced to see if they might like the same colors. Using the previous example, maybe someone else that purchased the same couch has already chosen a good coordinating wall color, but there is no way for a later purchaser of the same item to know that.

DETAILED DESCRIPTION

Figure 1:
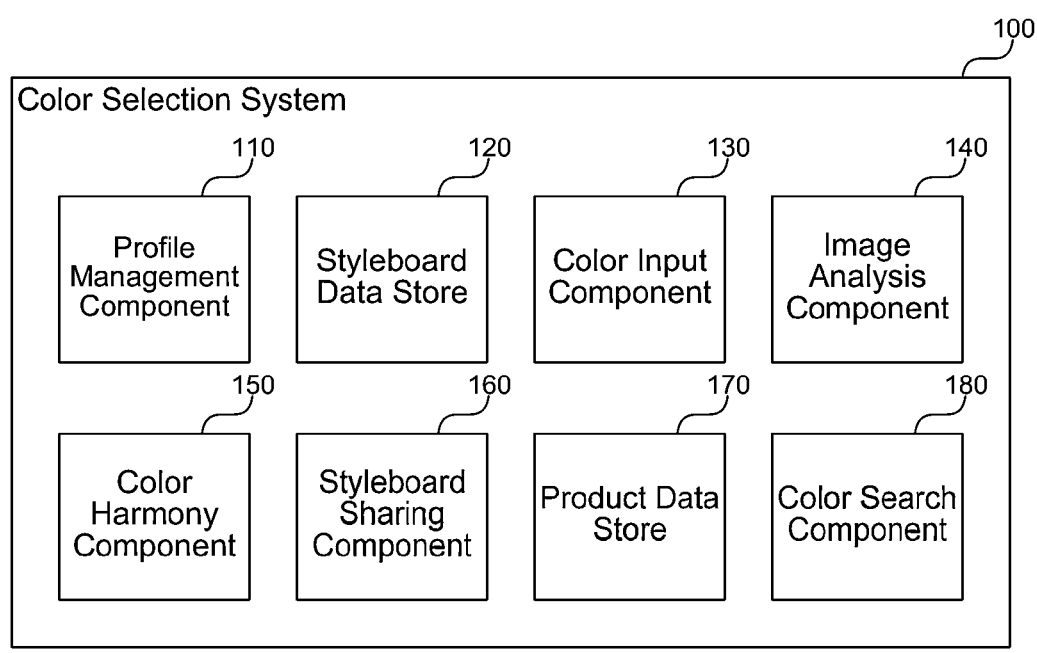
FIG. 1 is a block diagram that illustrates components of the color selection system, in one embodiment.

A color selection system is described herein that provides a facility for customers to receive color selection assistance for color-related buying decisions. In some embodiments, the color selection system divides color space into harmonious groups based on hue, chroma, and saturation whereby every major hue family is represented in each color group (e.g., red, orange, yellow, yellow-green, green, blue-green, blue, violet). This ensures that complete harmonious palettes can be created to align with every user's color and product preferences, across all brands and product classes. In some embodiments, the system also provides software for uploading and analyzing photographs or digital images to profile particular products for color information. This software allows images to be profiled, or classified into the system and assigns a harmonious color palette to each image. This is a great way for users to create color palettes based on images that inspire them. It also enables product images to be loaded into the database/profiled into the system so that users can find products that match their color preferences. In some embodiments, the system provides a search facility. Search is built upon the color classifications and image upload software. Search enables users to find colors, products, and styleboards that match their design concept, or dynamically build their design concept through their search queries. Thus, the color selection system takes much of the guesswork out of color and allows users to confidently select a palette of colors for color-related buying decisions.

In some embodiments, the color selection system includes a variety of devices, such as client devices from which customers access the system, administrative devices from which vendors or others manage the system, and an application stack that provides a variety of services and views. The devices may include a variety of mobile computing devices (e.g., laptops, tablets, and smartphones), desktop computing devices, servers, cloud-based services, and so forth. Vendors may access the system to upload product images or populate available colors of a product, while customers may access the system to purchase products, get help with color selection, and so forth. The application stack may be provided on a proprietary server, hosted by a cloud-based service or other datacenter, or integrated with a particular vendors products buying system (e.g., integrated into an online paint or furniture store).

The application stack includes the software components that make up the system. These may include a web server providing client and/or administrative access through a web-based interface, such as SSL and NGINX. The web server may store user profile information, such as a username and authentication information, as well as past color history, color preferences, and so forth. The application stack includes an application server that handles application processes described herein. The application stack may also include one or more databases or other data stores, such as Postgres QL and Redis. The database provides data storage and caches, as well as a process queue and worker process for performing at least some of the processes described herein. The application stack may also provide particular tools, such as a screenshot tool that takes pictures of images and styleboards.

The screenshot tool takes pictures of styleboards and stores them in the database as a secondary record. The screenshot tool is also utilized when a user opts to save his or her styleboard and a PDF or other document format of the screenshot is generated.

The database stores color, product, image, styleboard, and user data. The database is composed of a request receiving component and process queue, a request processing component (worker process), and a cache. The process queue is used to store user requests that are either resource intensive, long running, or low priority. The queue holds the information about the task that needs to be fulfilled. Using the process queue helps to improve workflow and speed of the system. For example, the system can use this to queue screenshots of styleboards that are stored in the database. The worker process interacts with the process queue. It receives a task and performs the task. For example, the system may have a worker process that takes screen shots of styleboards. The cache stores data sets in memory to speed up the system. This is used to reduce database congestion and query speeds by caching results.

The application server is comprised of two high-level components: views and services. Views are what the user interacts with (UI), and services run the application processes to serve the requested information to the user (back-end). The following breakdown defines the components that comprise views and services.

```
                Views
                    Path
                        Quiz
                        Search
                        Upload Photo
                        Personalize
                        Brand template
                    Login
                    Styleboard
                        Share
                        Publish
                        Color
                        Design Box
                        Edit
                        Upload Photo
                        Purchase
                        Settings
                        Comments
                    Profile
                        Styleboard Manager
                        Trend Watch
                        Followers
                    Design Box
                        Search
                        Filter
                        Upload Photo
                        Create Styleboard
                    Report
                Services
                    Path
                        Quiz
                        Search
                        Upload Photo
                            Crop
                            Revert
                            Paint
                            Replace
                            Undo
                        Personalize
                        Brand template
                    Login
                    Report
                    Purchase
                        New process
                        Update
                    Profile
                        Creation
                        Update
                    Styleboard
                        Share
                        Publish
                        Color
                        Design Box
                        Edit
                        Upload Photo
                        Purchase
                        Settings
                        Comments
                    Design Box
                        Search
                        Filter
                        Upload Photo
                        Create Styleboard
```

Color Classification

The following paragraphs provide a system view of the color classification side of the color selection system.

Color Vendors, such as a paint company like Sherwin Williams, can provide physical samples of all colors that will be entered into the database. Color samples can be paint chips or color swatches (e.g., 3×5 or larger). Vendors may also provide a database, or list, detailing the name/number, RGB, and CMYK values for each color that will be entered into the database. RGB is the standard language for showing color on an electronic device—i.e., computer, while CMYK is the standard language for printing colors. Every color entered into the database is defined in both languages as colors can be viewed on electronic devices by users as well as printed. Physical samples may also need to be reviewed because the color viewed on an electronic device such as a computer will often have some degree of variation from the physical color sample, and the accuracy of the system is improved when the physical color sample is used as the basis for classifying colors into a color group.

From this information, the color selection system creates a color database. The database enables input, aggregation, and storing of color data. Databases may be as simple as a spreadsheet or as complex as a cluster spanning multiple servers and locations. Data fields for color data include but are not limited to: color name and/or number, color group, RGB, CMYK, NCS and/or Munsell color system notation, primary Hue tag, secondary Hue Tag (if applicable), coordinating neutral group, intensity, mood description, undertone description, and designer recommended palette (if applicable). The color name/number provides the identification for the color. The color group classifies the color into a harmonious collection of colors so that it is easy to find other colors and products that coordinate with that specific color. RGB and CMYK values translate the color for electronic devices and print media. NCS, or Natural Color System, and the Munsell Color System are color notation systems that describe color in terms of its value (light to dark), chromaticity (saturation or brightness) and hue (color). These notation systems are very helpful to use as they define how people perceive color, which is useful when comparing large data sets of color.

The primary hue tag describes what the color looks like—i.e., red, orange, green, blue. The secondary hue tag is assigned to colors that look like two different hues depending on the light or context. For example, a color may look gray in one palette of colors, or purple in another. Alternatively, a color may look white in some settings and green in others. These tags allow the user to search for color by hue and help the user understand what the color may look like in different contexts. The coordinating neutral group provides the user with a set of neutral colors that coordinate well with the user's selected color. Intensity allows the user to search for colors by intensity such as light, medium, and dark. The mood description helps the user understand what mood the color will evoke, such as peaceful or energetic. The undertone description is very useful for whites, grays, and beiges as it defines how the color may appear. Designer recommended palettes provide the user with a collection of colors that match the user's color group, mood, and style preferences.

The system may also include one or more secondary databases, or related tables within the primary database. Secondary databases that relate to the primary database include designer-recommended palettes, coordinating neutral groups, and other collections of colors. Designer recommended palettes include lists of colors in palettes that are linked back to the primary database via tagging. Coordinating neutral groups contain the list of coordinating neutrals that are assigned to each color, which are then linked back to the primary database via tagging. The other collections of colors may include similar colors, popular color palettes, and so on, and are aggregated and linked back to the primary database via tagging.

In some embodiments, the color selection system may include a spectrophotometer. The spectrophotometer is used for color extracting and allows the operator of the system to read each physical color sample to generate additional data not typically provided by vendors. The spectrophotometer may be a handheld device such as the Xrite Color Capture tool, or a smartphone running color analysis software. The spectrophotometer may include the ability to report NCS and/or Munsell notations.

System Components

FIG. 1 is a block diagram that illustrates components of the color selection system, in one embodiment. The system 100 includes a profile management component 110, a styleboard data store 120, a color input component 130, an image analysis component 140, a color harmony component 150, a styleboard sharing component 160, a product data store 170, and a color search component 180. Each of these components is described in further detail herein.

The profile management component 110 stores one or more user profiles and associates one or more styleboards with each user. Users of the system 100 can register to create an account with the system 100 that stores user information and color-based work completed with the system 100. For example, a user's profile may include previously uploaded images used for color input, color group choices, styleboards created for the user or by the user, products selected by the user, user demographic information, user store preferences, and so on. If the user is a trade professional or company, the component 110 may include a link to their business website and a description of their products or services. The component 110 may include logic for authenticating users, which may be custom or leverage third party authentication, such as logging in with Facebook or similar account credentials.

The styleboard data store 120 is a storage facility for storing user-created styleboards and associated information. After users create styleboards using any of the processes described herein, the system 100 saves these styleboards and may share them with other users. In many cases, the system 100 encourages a public sharing of color results so that the community of users of the system 100 can benefit from one another. When a user selects a paint color, product, or other input that has an associated color or colors, the system 100 can then present related styleboards from the styleboard data store 120. The system 100 may also allow filtering styleboards that are displayed based on various criteria, such as the user (e.g., a famous designer or favorite user) that created the styleboard, the products associated with the styleboard, a vendor that has matching colors related to the styleboard, and so forth.

The color input component 130 receives a starting point for finding one or more harmonious colors in the form of one or more input colors. The component 130 may receive the input colors from the user, from a third party, or by automatic analysis of an image provided by the user. The user may have already picked certain colors or may have selected a product having certain colors from which the system 100 can obtain a starting point. In some cases, the user selects a product and the seller of the product provides color information to the system 100. In other cases, the user may manually select a color group or provide an image of a room, product, or other color-containing scene that includes colors that the user wants to harmonize with. The system 100 then selects colors that go along well with the input colors.

The image analysis component 140 provides color input by automatically analyzing an image uploaded by a user or by a product partner via a bulk data feed. The image analysis component 140 may use various techniques to extract colors from an image, such as performing an exhaustive search of the image for colors, producing a histogram of colors in the image, identifying the most frequently occurring colors in the image, and so on. The component 140 may provide an interface through which a user can specify an image to upload, and the system 100 then processes the image to identify dominant or relevant colors within the image. These colors can then act as a starting point for finding harmonious colors with which to create a styleboard or launch a color or product search for the user.

The color harmony component 150 selects one or more related colors based on the received starting point input colors that are harmonious with the starting point input colors. Determining which colors are harmonious is a proprietary process performed by the color selection system that is described in further detail herein. Selecting harmonious colors involves analyzing multiple aspects of color including hue, chroma, saturation, and so forth. Unlike previous systems that take a single color and find a single other color based on traditional color theory, such as by using a color wheel, the color harmony component 150 can receive multiple input colors and produce an unlimited number of output colors where all of the colors, both input and output, are harmonious as a group. This allows the system 100 to offer the user many more colors and/or a comprehensive color group that gives the user more choice when selecting and using colors. For example, in a typical styleboard produced by the system 100, the system 100 may display 5, 10, or even more colors to the user that are harmonious with the color input provided by the user. If the user provided a product, such as a sofa, as input, then the output colors may be useful to the user for selecting throw pillows, wall colors, colors for other furniture in the room, decorations, art, and so on. As discussed further herein, the user can even select each of the related colors to find products that evoke those colors.

The styleboard sharing component 160 allows the user to share the results produced by the color harmony component 150 with other users. In some embodiments, the system 100 encourages users to publicly share the results of using the system 100 so that other users can benefit from a strong community of users. A user may share styleboards created by the user on the website associated with the system 100 as well as on popular social networks, such as Facebook, Twitter, Pinterest, and others. The system 100 may also provide the ability to email or post links to a styleboard so that others can select the link to be directed to a website associated with the system that can display the styleboard referenced by the link to them. The styleboard sharing component 160 is responsible for maintaining and updating privacy and related settings associated with each styleboard that determine the visibility of the styleboard to users other than the creator of the styleboard. In some embodiments, designers or other professionals may sell or provide access on some other terms (e.g., along with product advertising) to styleboards that they create, and this is also managed by the styleboard sharing component 160.

The product data store 170 stores a set of products and related color information that describes one or more colors evoked by each product so that users can navigate via a color search to related products and from products to related colors. This provides a powerful use for the system 100 as it allows a user that has one or more color inputs from colors the user has already selected to make a direct tie through those colors to other related products. If the user has already selected or purchased certain products, the user can find those products in the product data store 170, discover color information about those products already stored in the system 100, and then find other products that are harmonious with those colors. Similarly, the system may create references between products and styleboards that use those products, so that a user purchasing a product can view previously created styleboards with that product. The storage facilities of the data stores described herein may include one or more files, file systems, hard drives, storage area networks (SANs), databases, cloud-based storage services, or other facilities for storing data over time.

The color search component 180 facilitates user-initiated searches for styleboards, products, and other colors using one or more query colors. The color search component 180 may search the styleboard data store 120, the product data store 170, invoke the color harmony component 150, or access external resources to find items related to a particular color. The results of such searches may be directly available to the user through a search interface of a website, mobile application, or other entry point to the system 100, and may be displayed in various interfaces of the system. For example, when displaying details about one of a user's created styleboards, the system may display similar or related styleboards in an area of the interface. Similarly, when a user is browsing products or colors, the system 100 may invoke the color search component 180 to be able to display related styleboards, colors, or other products alongside the browsed products or colors. The system 100 may also initiate searches on its own or provide an external application programming interface (API) through which external systems can invoke the color search component 180 to perform color-based searches. Similarly, the system 100 may expose other components of the system to external systems, such as to allow integration of the system 100 with a third-party website.

The computing device on which the color selection system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

System Processes

Figure 2:
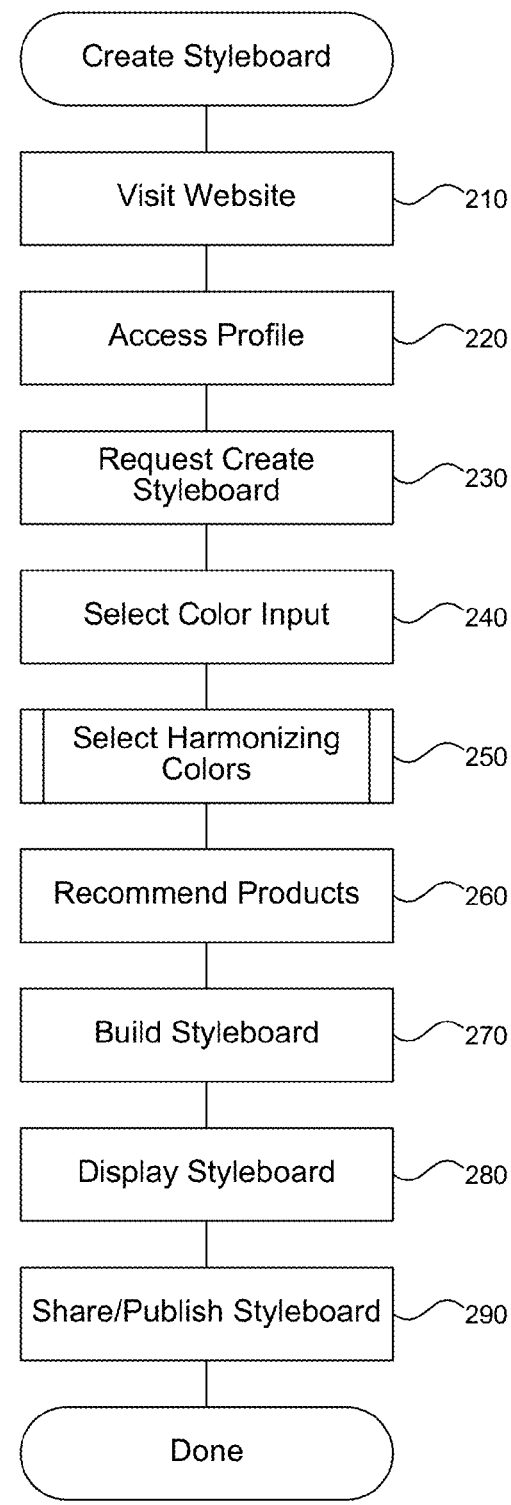
FIG. 2 is a flow diagram that illustrates processing of the color selection system to create and share a styleboard, in one embodiment.

FIG. 2 is a flow diagram that illustrates processing of the color selection system to create and share a styleboard, in one embodiment. Beginning in block 210, the system receives a request from a user to access an interface of the system for creating styleboards. For example, the user may visit a website associated with the system, such as www-.stylyze.com, or a third party website that leverages the functionality of the system. The user may use a web browser, mobile application, desktop application, or other tool for accessing the interface provided by the system, and the system may provide a backend server, datacenter, or cloud based service that receives and processes the request.

Continuing in block 220, the system accesses a profile associated with the user and stored by the system. The profile may be a previously created one from the user's previous visit to the system, or the system may prompt the user to create a new profile if it is the user's first visit. The system may provide custom authentication or may allow the user to use another profile associated with the user, such as a Facebook account, to authenticate with the system. The system uses the profile to store user information (e.g., a name, email address, profile picture, or other information), user-created styleboards, user product purchases, and so forth.

Continuing in block 230, the system receives a request to create a new styleboard. The system interface may provide a button or other control that the user can activate to create a styleboard. Although shown here as an early step in the process, in other scenarios the user may take some other action first, such as purchasing a product, selecting a color, or other action and the system may automatically create a styleboard. The system is flexible, allowing the user to proceed according to a workflow that works best for the user. The system allows the user to approach from a variety of starting points and get to a desired result. For example, if a user has a product but is unsure of coordinating colors, then the system can help the user find coordinating colors. If the user has colors in mind but needs coordinating products, then the system can help the user find coordinating products, and so on.

Continuing in block 240, the system receives a selection of input color information from the user. The user may provide input color information in several ways. First, the user may simply select a color from a color chart or other method (e.g., providing RGB values or a paint manufacturer and code). Alternatively or additionally, the user may upload an image that the system will automatically analyze and pick input color information from. For example, the user may have a picture of a room the user is trying to decorate, a product the user has bought or plans to buy, or other subject in an image that can provide input color information to the system. As another option, a user may select a product, previous styleboard, or color group to use as input for finding additional colors.

Continuing in block 250, the system selects one or more colors that coordinate with the received input color information. Colors that coordinate are selected according to multiple criteria as described further with reference to FIG. 4 and elsewhere herein. The system considers a variety of color factors, such as hue, chroma, saturation, and the like, to identify colors that together make up a color family that is harmonious together. The identified colors may include shades of the same color as an input color, shades of different colors that work well with the input colors, and so forth. In some embodiments, the system provides configuration information that allows a user to tweak the output of the color harmony process by specifying parameters that can affect the distance or other factors between input colors provided by the user and output colors selected by the system.

Continuing in block 260, the system optionally recommends one or more products that coordinate with the received input color information. In some embodiments, the system includes product recommendations as well as color recommendations, so that users can build complete design concepts more easily. The system may perform a color-based search based on the selected one or more coordinating colors to identify products that are a good fit for the selected colors, and recommend those to the user. In addition, if the user has provided any additional information with the search, such as style information or search terms, then the system applies these to further filter the products that are selected.

Continuing in block 270, the system builds a styleboard based on the received input color information, the selected one or more coordinating colors, and the recommended products. In some embodiments, a styleboard is a user interface provided by the system that includes two or more colors across one axis (e.g., across the top), an image or other associated source of the colors, and additional images or product modules that complete the design concept in the main area of the interface. The system may modify how many colors are shown based on the user's current task, and may select a default number of colors to show (e.g., top five) even though the system selects more colors in the color harmony process.

Continuing in block 280, the system displays the built styleboard to the user. The styleboard may be displayed alone or alongside other information, such as related styleboards, other styleboards created by the same user, other styleboards that have the same or similar colors, and so forth. The system may display the styleboard on a web page, in a mobile application, in a desktop application, or elsewhere (e.g., by emailing the styleboard to the user).

Continuing in block 290, the system receives a request to share the styleboard with one or more other users of the system. The system may encourage sharing of styleboards with a larger user community to increase the value of the system to all of its users. Users may share styleboards using the system itself, which may provide an interface for browsing shared styleboards, as well as through external systems like social networks, that provide for sharing data between users. For example, styleboards can be shared using Facebook, Twitter, Pinterest, email, third party websites, blogs, and so on. In some embodiments, a user may limit sharing of a styleboard to a particular identified user or group of users or may choose not to share a particular styleboard at all. After block 290, these steps conclude.

Figure 3:
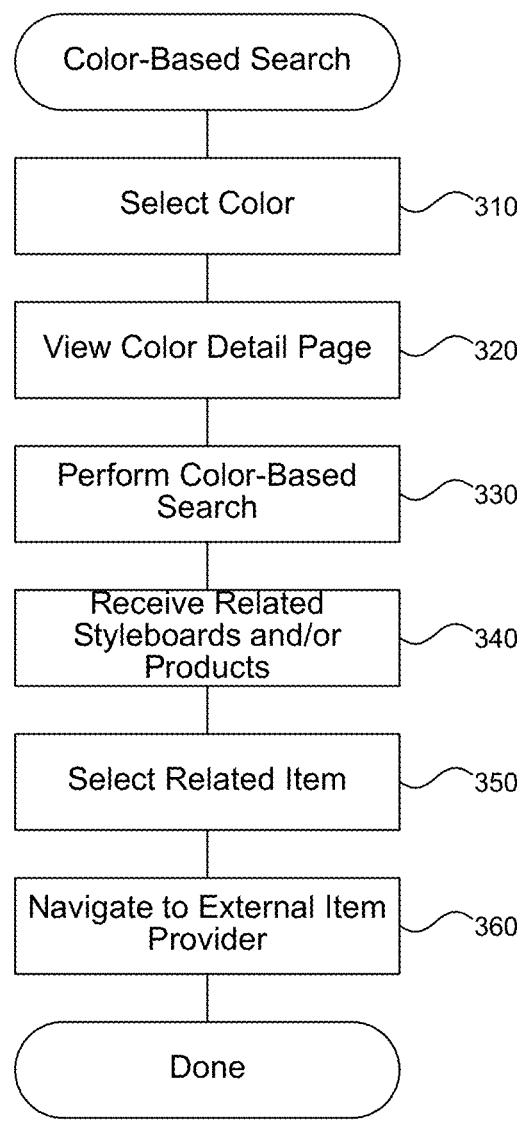
FIG. 3 is a flow diagram that illustrates processing of the color selection system to perform a color-based search, in one embodiment.

FIG. 3 is a flow diagram that illustrates processing of the color selection system to perform a color-based search, in one embodiment. A color-based search is a search that starts with one or more input colors and attempts to find one or more related colors, products, styleboards, photos, or other items related to the input colors.

Beginning in block 310, the system receives an input color that will comprise a query of a search to find one or more result items related by color. The query may come from a color input by the user, a color within a styleboard selected by the user, a product selected by the user, or another source. In some searches, the user may select multiple colors as input and the system will perform a search that finds items sufficiently related to all of the input colors. In some embodiments, the system associates navigable links to displayed items such that many items displayed by the system can be selected to perform a color-based search. For example, selecting a displayed color (e.g., a virtual paint chip), a displayed style board, a displayed product, or other items can lead to a color-based search using colors in that item as input for the search. The system may also receive additional input for the search query, including one or more keywords or hash tags. The system applies any additional input to limit or filter search results to result items that match the additional input. For example, if a user searches with a color and a keyword "tile", then the system might return search results including tile products that coordinate with the given color.

Continuing in block 320, the system displays a color detail page for the selected color. For example, if a user selects a color that is included in a styleboard, the system may display further information about that color, such as the color's name, a manufacturer that sells paint of that color, a color code used to identify the color (e.g., for purchasing paint of that color), and so forth.

Continuing in block 330, the system performs a color-based search using the received input color to identify one or more items related by color to the received input color. The identified items may be products, styleboards, other colors, or other items that are related to the input color. In some embodiments, the system maintains a relational database or other data store that indexes items by color and facilitates efficient searches by color using the index. For example, the system may store a database of products with a table that associates each product with colors evoked by each product. Similarly, styleboards include one or more colors (typically several), and the system may index styleboards by color so that an input color can be used in conjunction with the index to quickly find styleboards that include that color. The system may also perform color harmony analysis to find related colors and may include results with the related colors as well. In some embodiments, the system scores results and sorts the results according to the score, where the score indicates a closeness of the match between the input color and each search result.

Continuing in block 340, the system produces one or more search results that include items related by color to the received input color. The system presents the search results to the user in a list or other interface from which the user can select one or more items to interact with and receive more information about the items. The system may perform color-based searches in association with various interfaces throughout the system, each interface directed to a different purpose of the user that may work to modify the search. For example, one interface may be directed to finding products related to selected input colors, and in such cases, the search results of a color-based search may be filtered to include only product-based results. The user can then select displayed products to browse the products, purchase the products, and so forth.

Continuing in block 350, the system receives a selection of a related item presented in the search results with which the user wants to interact further. If the related item is a product, then the user may want to find out pricing for the product, view additional images of the product, purchase the product, review the product, and so forth. If the related item is a styleboard, then the user may want to view the styleboard, ask the user that created the styleboard a question, print an example of the styleboard, find products related to the styleboard (e.g., through a further color-based search), and so on.

Continuing in block 360, the system optionally navigates to an external site that provides further information about the related item to the user. In this way, the system provides a powerful link to many available websites or other interfaces by tying potentially disparate sources together by color. For example, the system may link to home remodeling centers, home improvement stores, paint retailers, furniture stores, or other providers of color-related items. Users previously had no good way to tie together the many items that may be related to a color decision. For example, remodeling a single room may involve the selection of paint colors, furniture, decorations, seasonal items, fabrics, and many other decisions, and each of these items may be provided by different retailers or other sources. Using the color selection system, the user can tie all of these items together, select harmonious items, and view them all in one place with the help of styleboards and other interface tools provided by the system. After block 360, these steps conclude.

Figure 4:
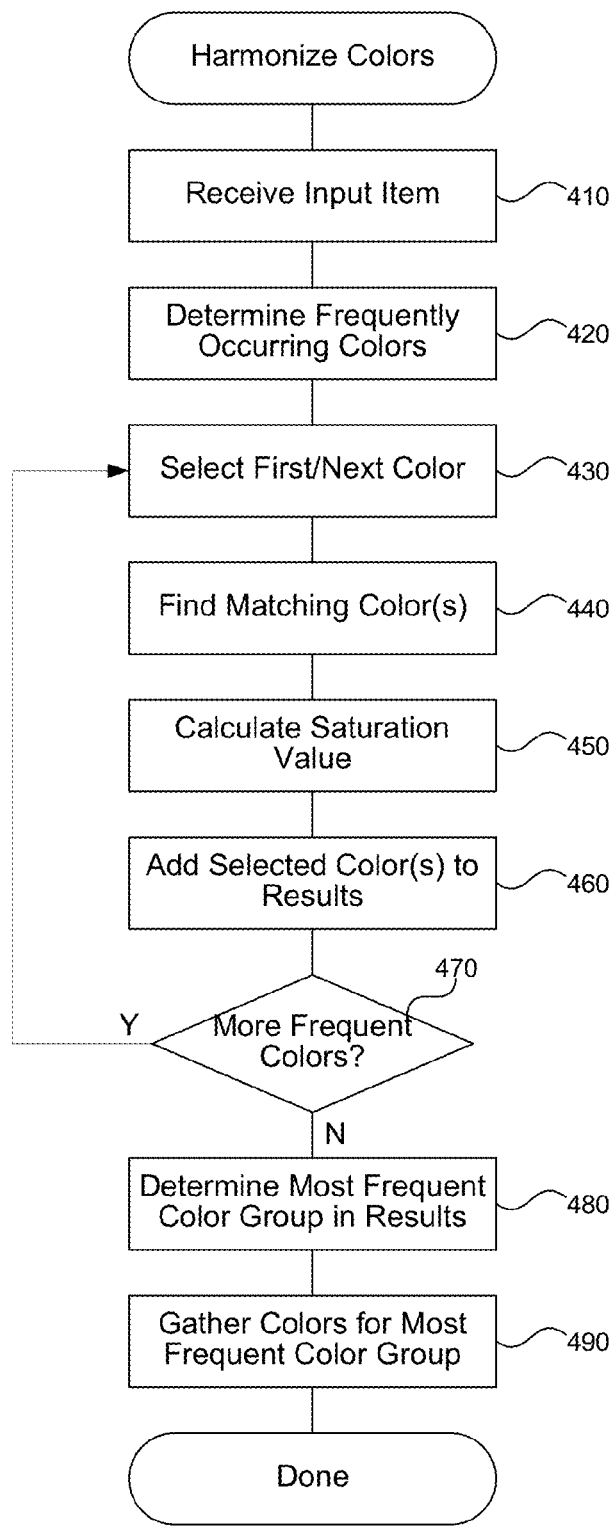
FIG. 4 is a flow diagram that illustrates processing of the color selection system to select harmonizing colors, in one embodiment.

FIG. 4 is a flow diagram that illustrates processing of the color selection system to select harmonizing colors, in one embodiment. Beginning in block 410, the system receives an input item for which to find harmonizing colors, the input item containing one or more input colors. For example, the user might upload a photo having multiple colors, select one or more colors from a color-picking interface, select a product from a product database that stores colors associated with the selected product, and so on. The user provides this selection to the system and the system extracts the color data from the input item to use as input colors. In the case of an image or other input, the system may allow the user to select a portion of the input, such as by cropping the image, and the system performs its matching on the selected portion.

Continuing in block 420, the system determines one or more frequently occurring colors in the input item. Frequently occurring colors may be determined directly by information already known about the item (e.g., a product database might have a list of colors of the product sorted by each color's dominance in the item), or may be calculated indirectly by observing the item. For example, for a digital image, the color of each pixel is known and a histogram of colors in the image can be created, such that frequently occurring colors can be mathematically determined.

Continuing in block 430, the system selects the first frequently occurring color for processing by the system. The system processes each frequently occurring color to identify one or more color groups associated with each frequently occurring color. The system then post processes the determined color groups to identify those that occur most frequently in the results.

Continuing in block 440, the system finds one or more colors that match the selected frequently occurring colors. Colors that match may be determined using a delta-E or similar process. Colors with low delta-E are deemed visually similar. The system may apply a database of colors to find the matching color with the lowest delta-E to the input color or may apply other color matching processes to find one or more matching colors. Each color has an associated color group, and in some embodiments, the system selects matching color groups rather than matching single colors. A color group provides the user with more options and related colors.

Continuing in block 450, the system calculates the saturation value of the selected color group color using HSV or similar saturation tables, where "S" denotes saturation.

Continuing in block 460, the system adds the selected color to a set of color group results. The system will find a color group for each frequently occurring color in the color input and will then select and/or rank those color groups to determine which ones will be returned as results from this process. In some cases, the requestor indicates how many matching colors are needed, and the system works to reduce a list greater than this number down to the requested number by ranking the color results.

Continuing in decision block 470, if there are more frequently occurring colors in the color input then the system loops to block 430 to consider the next frequently occurring color. The system selects and processes each frequently occurring color then moves to 480 to post process the results and find the best match or matches. Although shown serially for ease of illustration herein, those of ordinary skill in the art will recognize that the above steps may be performed in parallel to increase performance and lead to faster results.

Continuing in block 480, the system determines the most frequent color group identified by considering matching color groups to each frequently occurring color. The system may determine the most frequent color group in a variety of ways, which may be user configurable in some implementations of the system. For example, the system can calculate the saturation of each of the matching color groups as calculated by adding the saturation of the selected colors within each matching color group. The color group with the highest saturation will be selected. Also, the system can add up the total number of matches from each color group and select the most frequently occurring color group. Alternatively, the system can weigh the matches to calculate the most frequently occurring color group. As another option, the system may convert each color group to two numbers, adding the numbers associated with the colors in two columns, taking the average of each column, and assigning the correct color group.

Continuing in block 490, the system finds colors from the most frequent color group by searching for colors using the frequently occurring colors as query input and restricting the results to colors in the most frequent color group. The system returns the matching colors to the user. This process may result in potentially many colors, and the system may rank the colors to identify the best matches to the user. For example, where five results are desired, the system may return the two most saturated colors followed by the three most commonly occurring colors. After block 490, these steps conclude.

One process performed by the color selection system for color classification is the population of the database for color profiling (e.g., for a first set of colors). The process begins with an administrator or other user entering the following information about each color: manufacturer name/identifier, RGB value, and CMYK value. Next, the user scans each color sample with a spectrophotometer or similar tool and enters the NCS notation or similar information. Next, the user compares the colors to the corresponding NCS or Munsell color using physical color samples. If the color is not a match, the user may create a new notation for hue and nuance and enter this into the database. Hue is defined as the percentage of yellow, red, blue, or green in a color. Nuance is defined as the lightness and chromaticness of the color.

Next, the system separates the colors by their hue notation so that all colors of the same hue are together. The system then further organizes the colors by their lightness and chroma in ascending order from smallest percentage of black and lowest chroma to highest percentage of black and highest chroma. The system separates the colors into their color group such that: 1) each hue notation is assigned a notation for temperature (e.g., warm, warm-cool, cool-warm, cool), and 2) each nuance notation (within a specific hue) is assigned a notation for clarity (e.g., clear, clear-muted, muted clear, muted). The notation for clarity may vary from one hue to the next such that two colors with the same nuance notation, but different hue notation, may be tagged differently for clarity. In some embodiments, color groups are defined by the following:

Star 1—cool-warm, clear
Star 2—cool, clear-muted
Star 3—cool-warm, clear-muted
Star 4—cool, clear
Sun 1—warm, clear
Sun 2—warm-cool, clear-muted
Sun 3—warm, clear-muted
Sun 4—warm-cool, clear
Earth 1—warm, muted-clear
Earth 2—warm-cool, muted
Earth 3—warm, muted
Earth 4—warm-cool, muted-clear
Moon 1—cool-warm, muted-clear
Moon 2—cool, muted
Moon 3—cool-warm, muted
Moon 4—cool, muted-clear The next part of the process is to enter the color group tag for each color in the database, followed by entering the hue tag for each color into the database utilizing a predetermined set of hues. Some hues may have two hue notations if they appear to be two distinct colors, depending on ambient light and the other colors they are placed with. Example hues are yellow, orange, red, pink, purple, blue, turquoise, blue-green, green, yellow-green, white, black, grey, brown, beige, and taupe. The system next receives the intensity tag for each color in the database utilizing a predetermined set of intensities set at predetermined levels of lightness and chroma (e.g., light, medium, dark). Next, a user enters the mood tag for each color utilizing a predetermined set of mood descriptors. Next, the user enters the neutral tag for each color utilizing a predetermined set of harmonious neutral colors defined by their temperature and hue undertone.

The user may also enter a color description tag that describes the intensity, hue, mood, and undertone where applicable for each color. The user can enter any designer recommended palettes for every color group×mood profile× style profile (i.e., Earth 1×elegant×contemporary). The number of palettes will be determined by the number of mood and style profiles. The colors in each palette are created by determining which hues and intensities evoke specific moods and are congruent with specific styles. These determinations are based on research in the fields of color psychology, design, and style trends.

Another process performed by the color selection system for color classification is the population of the database for color profiling for subsequent sets of colors. The process starts with a user entering the manufacturer name/identifier, RGB, and CMYK values for each color. The system compares the RGB values of the new color set to all of the existing RGB values in the database and matches similar values using the gather colors process described herein. The system compares the matching colors using physical color samples to verify the match. If they are a match, the color is entered into the database with all of the corresponding tags. If they are not a match, the above process is repeated to correctly profile the color.

Another process performed by the color selection system for color classification is the population of the database for product profiling. The process begins with a user entering a product (or products) into the database. This may occur via a bulk feed where the vendor's online catalog is imported into the database. A vendor can be any party who is using the system by having their product(s) entered into the database. The online catalog can also be imported manually or via an automated application-programming interface (API), such as via a self-serve option whereby the vendor can select specific products to enter. These selections can be submitted by the vendor or by the system on behalf of the vendor. Next, a user enters a variety of search tags, including, for example: product name/number as listed by vendor, uniform resource locator (URL) for product on vendor's website, product image, product description, product price if applicable, available retail locations if applicable, color system tags, product type (i.e., couch, rug, table, shirt), style, and other related product search tags. The color system tags align each product with the colors classified by the color selection system. Each product image is processed using the upload photo process described herein. Each product is tagged by color group, coordinating colors from that color group are pulled from the photo, and all tags associated with those specific colors. The process can be automated with quality control check parameters set by vendor and product type.

Another process performed by the color selection system is for creating user profile preferences. When a user creates a login, the following types of information may be captured and stored in the database: e-mail address, password, Facebook login, acceptance of terms, opt in/out of promotions, country/region/language, and other related login preferences. When a user builds out his or her profile the following may be captured and stored in the database: name, website URL (for professionals), description, location, profile picture, color group, preferred colors and products, portfolio (for professionals), favorite styleboards, account settings, public vs. private, and professional upgrade status (for paid subscriptions).

Another process performed by the color selection system is for creating styleboards. When a user creates a styleboard, it is assigned an ID and stored in the database (along with its components listed below). The screenshot tool takes a picture of the styleboard and stores the picture in the database as a reference picture. The information stored may include the uploaded photo(s), colors in color palette, color swatch, products saved to styleboard, "get this look" colors and products, styleboard title, preferences such as background color, order information if online order is placed, user name, comments, and other related information.

Another process performed by the color selection system is for a feature referred to as trend watch. When a user chooses to "watch" a styleboard, that styleboard tag is saved to the user's trend watch list. When a user chooses to "follow" an author (company or individual user), that author's tag is saved to the user's trend watch list. When a user chooses to "watch" a color or product, that item's tag is saved to the user's trend watch list. When a user chooses to "un-follow" any of the above, the tag is removed from the user's trend watch list.

Another process performed by the color selection system is for a feature referred to as design box. When a user creates a profile, a design box is also created. The design box is a receptacle that can receive colors and products the user likes for future use. The design box is tagged to the user's identifier/profile. When an item is saved to the design box, the item is tagged to the design box. Users can add their own tags to items saved into their design box. These tags are attached to the item and the user identifier. The user can sort the design box by color group, which shows all of the items in the user's design box grouped by color group. The user can also search the design box, which initiates a search of all items tagged to the user's design box. Users can upload photos to their design box, which adds the user's user identifier tag to the image.

Paths

The view the user is working within interprets the path data. A description of the available views such as quiz, upload photo, and so forth follows below. On the backend, the user engagement with the site (as defined below) directs their path (e.g., responses to quiz, uploaded images, search queries, styleboard personalization, and brand Template (i.e., banner from specific partner's website). Paths are comprised of mood (optional), style (i.e., Contemporary, Traditional, Natural, and Timeless), color group (i.e., Sun, Moon, Earth, and Star), subgroup (i.e., 1, 2, 3, and 4), color partner (i.e. General Paint, Glidden), product partner (i.e., Home Depot, Crate and Barrel), styleboard identifier, design box identifier, or any other relevant component that directs the path. Every path has an identifier. The identifier defines the associated color group, recommended colors, recommended products, and associated styleboard. Paths are stored in the database.

One process performed by the path component of the color selection system is a color quiz. A quiz begins when a user enters the website and chooses to take the color quiz. The first question asks the user what mood they want to evoke utilizing a predetermined set of moods and a combination of words and images to describe the moods (e.g., bold, classic, cozy, elegant, energetic, feminine, masculine, peaceful, romantic, vintage, or others). The second question asks the user what image best represents their style using a combination of words and images that define their style (e.g., contemporary, natural, timeless, traditional, or others). The third question asks the user which color group the user is most drawn to (e.g., one color group from each of the primary color families; Earth, Sun, Moon, and star may be shown, with the specific color group shown from each color family determined based on how the user responds to the first two questions). The system may show, for example, a subset of 30 colors for each color group. The results page provides the user with the following information: the user's color group is identified along with a set of words that describes the color group, a designer recommended color palette that is from the user's color group and evokes the user's specified mood and style preferences, and more colors from the user's color group to provide additional colors to choose from.

Additional questions can be asked to define what space the user is working on (i.e., kitchen, bedroom, bathroom), or what the user is looking for (i.e., couch, carpet, and so forth). These questions result in a results page comprised of both color and product recommendations. The user is asked to select their favorite colors and products from the recommendations. A styleboard is generated for the user populated with the user's selections. The above process can be accessed via a website, in-store kiosk, mobile device, Facebook application, and any other application not referenced above. A brand template streamlines the results to the quiz so that only products from that specific brand are recommended (e.g., when the system is integrated into a particular vendor's own website). A "brand" can be a product brand such as Kohler, or a retailer brand such as Home Depot.

On the backend, the user's response to the quiz directs the user's path. Each response refines the available paths stored in the database. At the completion of the quiz, the matching path is presented to the user. The color quiz involves a client device, the system database, one or more paths stored in the database, a web server, and the application stack described herein.

The color selection system includes a subsystem for uploading photos to determine colors present in the photo (e.g., a digital image). A user enters the website and chooses to upload a photo. The user is taken to a photo upload screen, which gives the user an option to "select an image" or drop a file into a predefined space. When the user clicks "select an image," a dropdown allows the user to select an image from the user's device. Upon selection of the image, the system will process the image and return the user the following information: the color group best represented by the image, a selection of coordinating colors from the color group represented by the image, and the selected image will be presented within the workspace. The user can then do the following: crop the image, undo the crop to restore the image to the state it was in prior to that crop, restore the image to restore the image to the state it was in when it was uploaded, and replace the image with a different image. Cropping allows the user to focus on a specific part of the image they want to pull colors from. Once the user is happy with their defined "crop area" they click "done cropping" and the system will return an updated data set per the cropped image, including color group, a selection of coordinating colors from the color group represented by the image, and the cropped image. In some embodiments, the system includes a bookmarklet tool that allows a user to "grab" an image off a website and input it into the system while retaining the original source link.

A recommended selection of colors is provided to the user, which the user can then refine. A styleboard is generated for the user populated with their selection of colors. The above process can be accessed via a website, in-store kiosk, mobile device, Facebook application, and any other application not referenced above. The user may also upload photos to an existing styleboard, in which case the system will only pull colors from the color group the user is working with on the styleboard.

On the backend, the uploaded photo is loaded into ndarray or similar, during which every pixel is made into a square, a number is assigned to the color of the pixel, and the image can be resized to a specified number of pixels for speed of processing. The image is flattened into a list of items (colors converted to LAB). The system checks to see if the image has already been processed—if yes, use the previous image processing codes. The system may use cluster algorithms to calculate centroids (pockets of similar colors). The system compiles a list of frequently occurring colors (centroids), from greatest to least. The system may use a histogram to calculate the number of occurrences of each centroid. The histogram determines the frequency of colors and orders colors from greatest to least number of occurrences. The system refines the list of frequently occurring colors. This may include removing the background color (if there is one). If the pixels in the four corners of the image are the same, the system may remove that color from the list of frequently occurring colors. Removing the background color is useful if the background does not relate to the subject of the image, such as a subject presented on a white or solid color background. The system may also merge visually similar colors together using a delta-E or other process (e.g., colors with less than 1.0 are perceived as being the same and combined). To highlight interesting colors, the system may remove the colors with low saturation.

The system converts the list of frequently occurring colors from LAB to RGB. The system uses "gather colors" to find colors in the database that most closely match the frequently occurring colors using a delta-E or similar process (e.g., colors with a low delta-E are visually similar, and the color in the database with the lowest delta-E to the frequently occurring color is the match). The number of colors returned to the user will relate to the number of frequently occurring colors run through the database. The system calculates the saturation of the returned colors by converting them to HSV, where "S" is the saturation value or using a similar saturation table, and orders them by saturation. For photos containing a highly saturated color(s) (0.55 or higher) the color with the highest saturation determines the best-fit color group. For photos that do not contain highly saturated colors, the color group containing the most saturation as calculated by adding the saturation values for each color in each color group, determines the best-fit color group. The system determines the best fit color group for the frequently occurring colors by: 1) adding up the total number of matches from each color group (frequently occurring color matched with color in database) and selecting the most frequently occurring color group, or 2) weighing the matches according to the histogram to calculate the most frequently occurring color group, or 3) converting each color group to two numbers, adding the numbers associated with the colors (color group for each color) in two columns, taking the average of each column, and assigning the correct color group.

The system then finds the colors from the best-fit color group that match the frequently occurring colors by using the "gather colors" process. The system runs the frequently occurring colors through the database restricted to colors from the best-fit color group. The system returns the matching colors to the user with their image. In some embodiments, the system will return ten or more colors with the image, and recommend five or more colors in a color palette. The five recommended colors are determined by surfacing the two most saturated colors followed by the three most commonly occurring colors. If the user crops the image, the system runs the image through the above process with the updated dimensions and returns the new results. The crop tool defines a set parameter within the photo and the above process is repeated. Restore restores the image to the user-uploaded image (if they have cropped it). Replace returns the user to the photo upload prompt to upload a new image. Create Styleboard initiates the process to create a styleboard (e.g., assign a "path" to the image comprised of the color group plus style type, where every color group has a corresponding style type). Uploaded images may be stored in the database and assigned an identifier.

In some embodiments, the user can request that the system "paint" the user's image with selected colors to visually see what a selected color will look like. The user enters paint mode, selects the color they want to paint with from the colors in their color group, and clicks on the specific part of the photo they would like to apply the color to. The user may also mask off specific areas of the photo to better define where the user wants to apply the selected color. The user can "undo" the color they painted with if they are not happy with the results. On the backend, the process is similar to uploading a photo until the step of creating a flattened list. From the flattened list, the system finds the color that the user has chosen to paint (the specific pixel of the photo they clicked on). The system finds the centroid that color belongs to. The system takes all of the pixel coordinates within that centroid and replaces the color with the color the user has selected to "paint" with (e.g., using a flood fill). If the user has masked specific areas, the system restricts the area to run the above process to the user-specified perimeter. Another option is to run a find edges process where the edges are identified. Based on the number of edges in the image, the number of centroids used to evaluate the image will dynamically change. The more edges in the image, the greater the number of centroids, which will improve the granularity/accuracy of the process. At the end, the painted image is stored in the database and assigned an identifier.

Search

In some embodiments, the system provides a search facility for searching for matching items and/or colors based on color-related information. The user enters the website and uses search. Search can be accessed a variety of ways such as using a search bar on a website associated with the system. Search may provide top level filters for searching styleboards, colors, photos, and products. Search has secondary filters of categories such as color (hue and color group), style, mood, and brand. The search filters refine and weight the results. Users can search by specific colors they like or have used in styleboard palettes—i.e., once a user has created a color concept on the user's styleboard the user can search for products that match those specific colors. Search is "and" compatible—i.e., search for couch and beige and Crate and Barrel. Users can search by a variety of color search terms, such as manufacturer name/number, color group, hue, RGB values, hex values, intensity, mood, style, room type, and other color related search terms. Users can search by the following product search terms: product name/number, product manufacturer or retailer, product type (i.e., couch, rug, table, and shirt), color, style, mood, room type, and other product related search terms. Users can search by the following author search terms: author name (styleboard author, could be an individual or a company), and styleboard name.

Search is dynamic. If there is no path assigned to the user, the user's responses will create a path, which will allow the system to return results weighted by the user's preferences. If the user does have a path, the results will be weighted from the first query. Search returns the following results: color(s) that match the search terms, product(s) that match the search terms, and any styleboard(s) that match the search terms. When the user clicks on a color, a "product details" page for the color is returned containing: the selected color, the corresponding color bio for that color that defines the name/number/mood/intensity, color group and description, coordinating neutrals, a set of harmonious neutrals that best coordinate with that color, similar colors, colors from the same color group that are lighter or darker than the selected color, more colors from the color group that coordinate with the selected color, styleboards that use that color, sharing options (such as e-mail, Facebook, Pinterest, Twitter), add to styleboard link, add to design box link, a link to view the color on the partner's website or add the color to their shopping cart, and other related information.

When the user clicks on a returned product, the following results are returned: a larger view of the selected product, product name/description, vendor name/URL for product, color group and color group description, tagged colors generated from the upload photo process and other recommended search tags, retail location finder for product (where applicable), sharing options (such as e-mail, Facebook, Pinterest, Twitter), styleboards that use the selected product, add to styleboard link, add to design box link, a link to view the product on the partner's website or add the product to their shopping cart, and other related information.

When the user clicks on a returned styleboard, the user can view the entire styleboard in "view" mode. They can "personalize" the styleboard, which allows them to add it to their profile and make changes. They can "watch" the Styleboard, which adds it to their trend watch list and notifies them when changes have been made to that styleboard. They can add colors or products from the styleboard to their own styleboard(s). They can click on a color or product on the styleboard to view the product details page for that item and see other styleboards using that item. The user can save colors and products they like into their design box. The user can add a color or product to a styleboard. They are provided with a list of their styleboards, including "New," and choose which styleboard they want to add the color or product to. The above process can be accessed via a website, in-store kiosk, mobile device, Facebook application, and any other application not referenced above.

On the backend, search queries the database for paths/tag tables and for images. When filters are applied to search, the Path identifier containing the relevant items is defined. The search query is submitted to the tag table and the results are returned. When items are added to a styleboard or design box, they are tagged with the user's identifier.

Styleboard

The paths above culminate in the user having the option to select a set of colors, images, and/or products and create a styleboard. The profile and selected items from the design box will be applied to the styleboard. The user can then refine their choices by adding items they want in their final concept (i.e., styleboard) from their design box or search results. A Styleboard is a virtual workspace containing the following components and functions. One function is edit color palette, color group. Users can view all of the colors in their color group and add them to their custom color palette. When a user clicks on a color, they can see similar colors and coordinating neutrals for that color. They can change the order that the colors in their color palette appear.

Another function is edit color palette, featured colors. When users add additional products or photos to their styleboard, their featured color palette will dynamically change to reflect a recommended palette based on the colors in their selection of images (photos or product images). Colors will only be returned from the color group the user is working in. Colors are returned by a process that defines a selection of neutral, base, and accent colors to ensure the palette is comprehensive and not comprised of all neutrals, or all accent colors. Another function is edit color palette, styleboard summary. The styleboard summary shows users all of the colors that coordinate with photos and products on their styleboard. Another function is edit color palette, design box. Users can choose from colors they have previously saved to their design box. The colors will be sorted by color group and weighted by the color group they are working with on the styleboard.

Another function is dynamic color swatch. The color swatch is comprised of the colors in the user's palette shown by use specification. The most dominant color will be the largest "swatch" of color. The second most dominant color will be the second largest swatch of color, etc. Order is specified by the order of paint chips in the users palettes such that the first paint chip will be the most dominant color, second paint chip the second most dominant color, etc. As the user's color palette adjusts the color swatch automatically adjusts per the above specification. The Color Swatch may be shared on Facebook, Pinterest, or other social networks.

Another function is uploading photos. When a user selects upload photo, the same process as defined above occurs except that the system will only return colors from the color group that the user is working with on the styleboard. Another function is painting an image. The user can choose to "paint" their photo to see what a selected color will look like. The user enters paint mode, selects the color they want to paint with from the colors in their color group, and clicks on the specific part of the photo they would like to apply the color to. The user may also mask off specific areas of the photo to better define where they want to apply their selected color. The user can undo the color they painted with if they are not happy with the results.

Another function is adding products. Users can add products to their styleboard previously saved into their design box. Users can access search via their styleboard and add products they like to their styleboard. Only products that match the user's search parameters and are tagged with the color group the user is working in will be presented. Another function is "get this look." Users can save products they intend to purchase into "Get This Look." The selected products are displayed, the color palette is displayed, and a shopping list is generated detailing the product name and link to the vendor site to purchase (for each product). Users can customize the placement of products within Get This Look. Users can customize the background color displayed on Get This Look. Get This Look may be shared via Facebook, Pinterest, or other social networks. Another function is titling a styleboard.

Another function is save. Save generates a PDF or other version of the styleboard for the user to download and save. Styleboards are automatically saved into a database. Another function is print. Print generates a PDF or other document containing the user's color palette and uploaded photos. Another function is email. The user can specify who they would like to send the styleboard to and include a personalized message. Another function is posting to social networks, like Facebook and Pinterest. The user can post the styleboard to their wall and add a customized message, or can "pin" the styleboard to the board of their choice with a customized message.

Another function is publish. Users can share their styleboard with the public where it can be viewed and personalized by other users. When they publish their styleboard, they can add a description. Public styleboards can be commented on by other users. Another function is settings. The user can customize settings for their styleboard such as background color. If the user is a professional, they can invite other users to view and edit their styleboard. In this case, one styleboard will be tagged with multiple user identifiers, the original author being the parent identifier. Another function is profile. The user can access their profile, manage their account, edit their profile (e.g., display name), manage their trend watch list, view their styleboards, edit their styleboards, create a new styleboard, find retail locations, and link to the community (e.g., blog, Facebook, e-mail).

Another function is online ordering. The user can place orders online for things such as color swatches by styleboard, color swatches by color group, paint, loyalty memberships, and so on. Orders are passed through to the applicable vendor partner for processing. The above processes and functions can be accessed via a website, in-store kiosk, mobile device, Facebook application, and any other application not referenced above.

On the backend, when a styleboard is generated it is assigned an identifier and path. All of the colors, products, and images on the styleboard are tagged to the styleboard identifier. The data from the styleboard is stored in the database (primary), and the screenshot tool takes a picture of it and stores that in the database (secondary). When the user refines their color selections, the path for the styleboard defines the colors served up (color group, attached neutrals, and recommended colors). The "color swatches" are populated based on the order of colors in the palette—the first color being the most dominant color in the swatch, the last color being the least dominant. The photo upload process follows the process specified in Upload Photo. The search process follows the process specified in Search—the path assigned to the Styleboard automatically refines the filters so that only items from the color group are shown.

"Paint" follows the "Paint" process. "Print" takes a screenshot of the styleboard and creates a PDF or other document. E-mail, Facebook, and Pinterest take a screenshot of the styleboard that is shared out over the specified medium. When a styleboard is "personalized," a clone of the styleboard is created and an updated profile identifier is assigned.

The user can view styleboards that have been created by other users via the main styleboard library or search. The user can click on a styleboard to see it larger in view mode. View mode allows the user to see all styleboard components but not make any changes to the styleboard. The user can choose to personalize the styleboard. This allows them to edit the styleboard and save it to their profile. The user can choose to watch the styleboard. This adds the styleboard to the user's trend watch list where they are notified when the author makes changes to the styleboard. The user can choose to follow the styleboard author. The user can like a styleboard and comment on a styleboard. The above process can be accessed via a website, in-store kiosk, mobile device, Facebook application, and any other application not referenced above.

On the backend, styleboards are shown on the landing page in view mode. When the user searches styleboards, the tag tables in the database are queried, and any filters applied defined by the path.

Profile

The user can customize their profile, which includes data such as, name, photo, URL (if professional), description, location, design preferences (i.e., preferred color group), and portfolio (if professional). The user can manage their account, changing settings such as public vs. private, professional upgrade, access trend watch, access design box, access styleboard manager (all of their styleboards), view their styleboards, edit their styleboards, create a new styleboard, view notifications, and create a new portfolio (professional users). The above process can be accessed via a website, in-store kiosk, mobile device, Facebook application, and any other application not referenced above.

Users build their trend watch preferences. When a user chooses to watch or follow a specific styleboard, that styleboard is added to their trend watch and they are notified when changes are made to that styleboard. When a user chooses to follow a specific user, that user (and all of their styleboards) are added to their trend watch and they are notified when the user they are following adds or edits styleboards. When a user chooses to follow a specific vendor, that vendor (and all of their styleboards) are added to their trend watch and they are notified when the user they are following adds or edits styleboards. For all of the above, notification can take the form of displaying: the updated styleboard into the user's trend watch containing the watched item. Users can choose to un-follow any of the above, which will prevent any further notifications. The above process can be accessed via a website, in-store kiosk, mobile device, Facebook application, and any other application not referenced above.

On the backend, every user is assigned a user identifier. All of the user's profile information is stored in the database with their identifier. All styleboards created are tagged with their identifier. When the user chooses to view or edit one of their styleboards, the database is queried and returns the requested styleboard. When a user watches a styleboard or author, either that styleboard identifier or author (user) identifier is tagged to the user's trend watch list.

Example Interfaces

The following paragraphs describe the related figures, which display example interfaces of the system for interacting with the user to perform select processes described herein.

Figure 5:
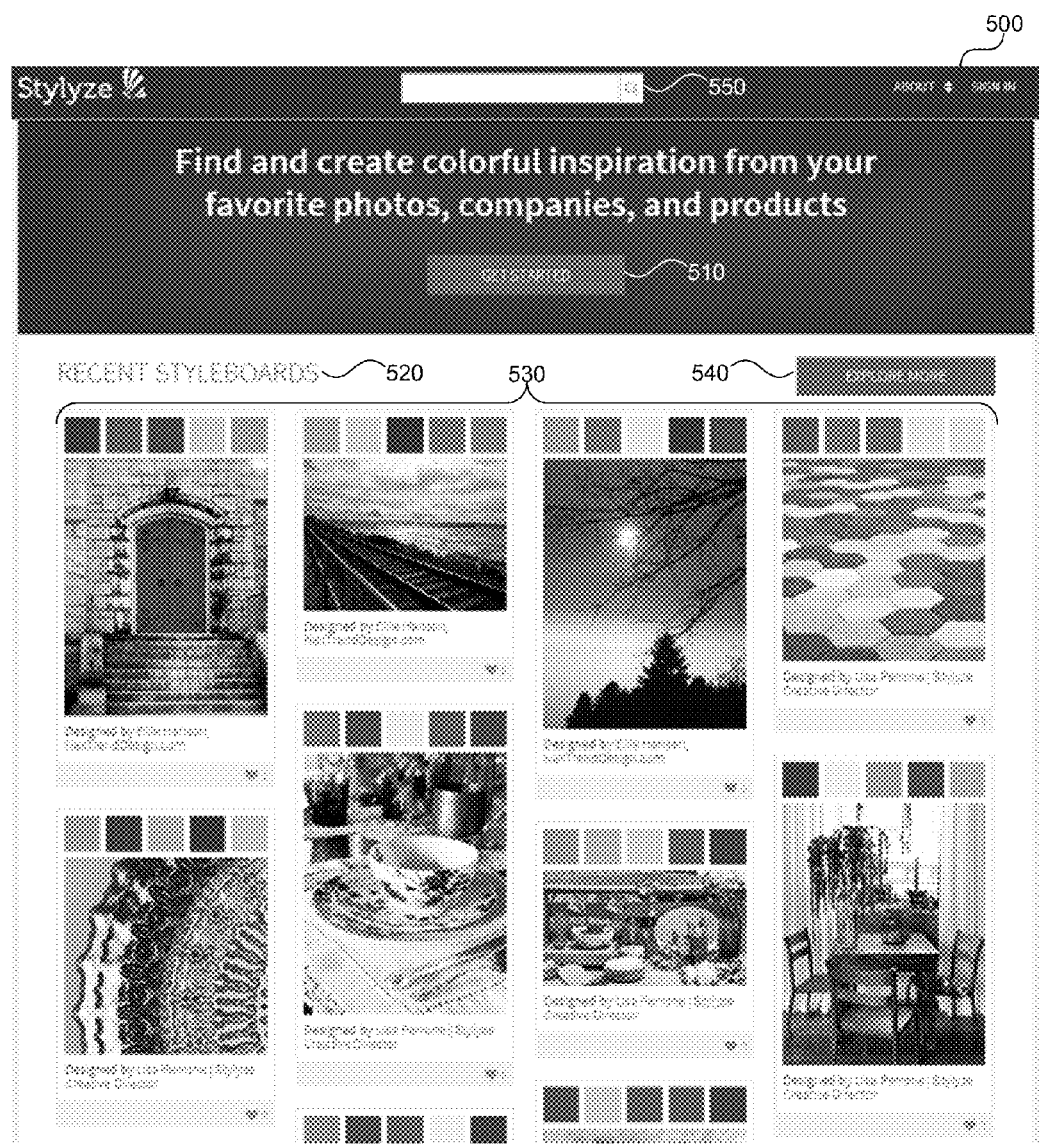
FIG. 5 is a display diagram that illustrates a front page of a website implementing the color selection system, in one embodiment.

FIG. 5 is a display diagram that illustrates a front page of a website implementing the color selection system, in one embodiment. The display 500 includes a get started control 510, a recent styleboards section 520, a display of recent styleboards 530, an explore more control 540, and a search box 550. The get started control 510 takes the user to an interface for signing up with the system and creating styleboards, such as that shown in FIG. 6. The recent styleboards section 520 includes a list or grid of recent styleboards 530 created by other users. Each styleboard, in the illustrated embodiment, shows five related colors on top, a main image related to the colors, and information about the user that created that styleboard. The explore more control 540 allows the user to navigate to additional styleboards shared using the system. The search box 550 allows the user to initiate a search to find styleboards or other items based on keywords or other selected input.

Figure 6:
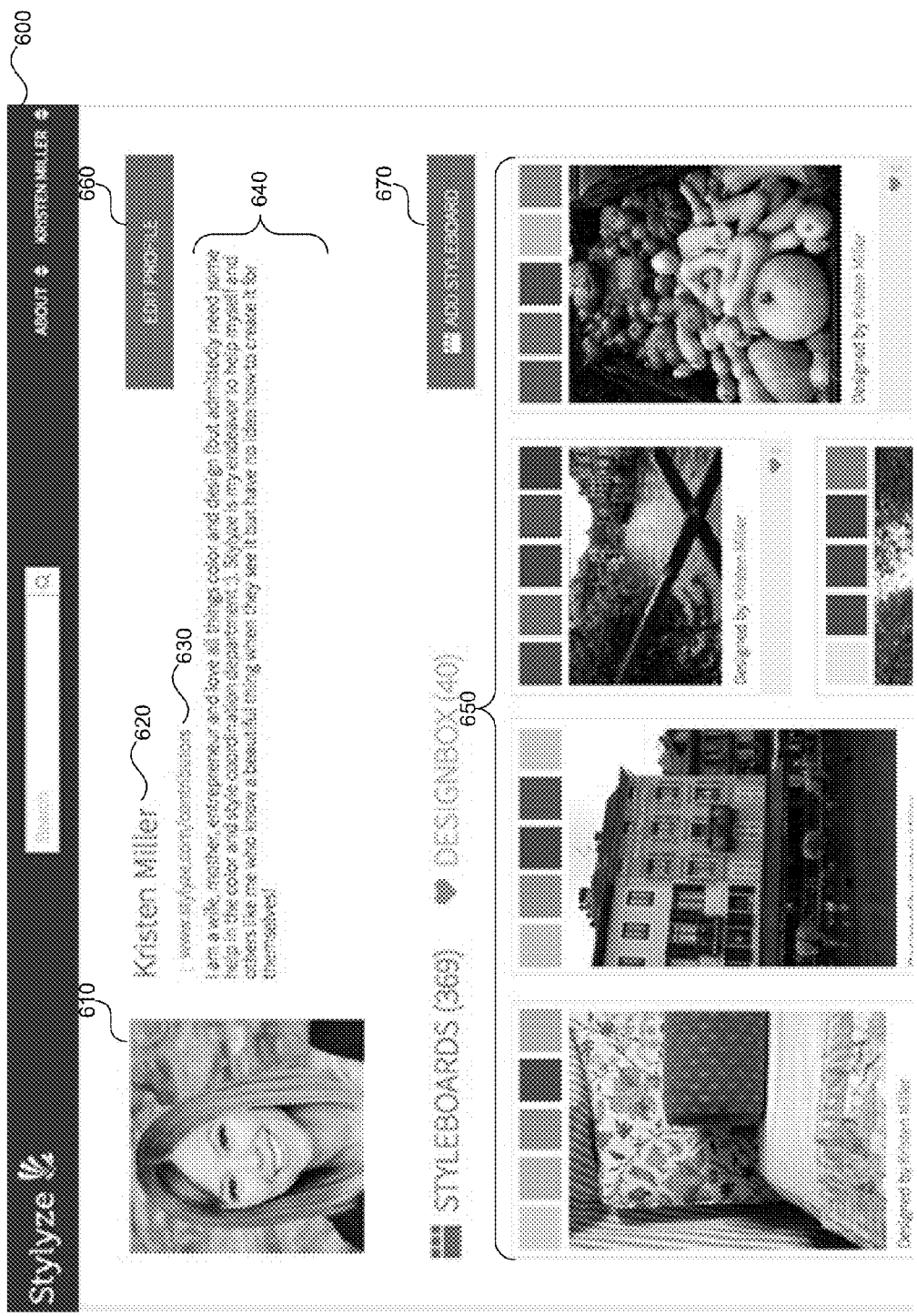
FIG. 6 is a display diagram that illustrates an interface for displaying a profile of a user of the color selection system, in one embodiment.

FIG. 6 is a display diagram that illustrates an interface for displaying a profile of a user of the color selection system, in one embodiment. The display 600 includes a user photo 610, a user name 620, the user's organization 630, a bio of the user 640, styleboards created by the user 650, a control for editing the profile 660, and a control for adding new styleboards 670. The system encourages the creation of a community around design, style, and color, and provides rich user profiles in some embodiments so that users can get to know other users and find out about each other user's experience. When a user views his or her own profile, the user has the option of editing the profile (e.g., by selecting a new profile image or changing the user's bio) as well as creating new styleboards. In some embodiments of the system, users may "follow" other users to receive notifications when they have created a new styleboard.

Figure 7:
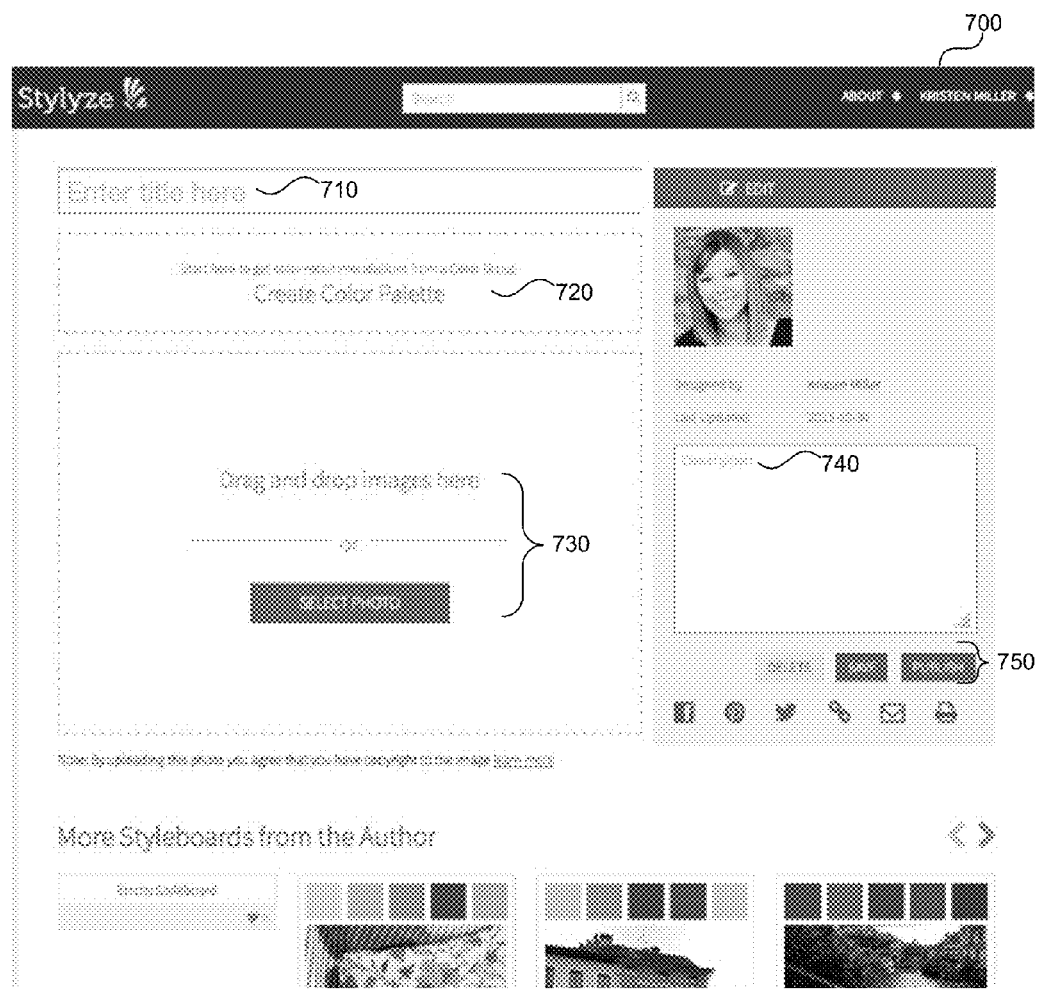
FIG. 7 is a display diagram that illustrates an interface of the color selection system for creating a new styleboard, in one embodiment.

FIG. 7 is a display diagram that illustrates an interface of the color selection system for creating a new styleboard, in one embodiment. The display 700 includes an area 710 where the user can enter a title for the new styleboard, an area 720 where the user can create a color palette for the styleboard, an area 730 where the user can drag or select images for the styleboard, an area 740 where the user can enter a description for the styleboard, and controls 750 for deleting/saving/publishing the styleboard. The create styleboard interface allows the user to start with colors or an image and create a styleboard. The user can also share the styleboard with other users and can control the description that other users will see.

Figure 8:
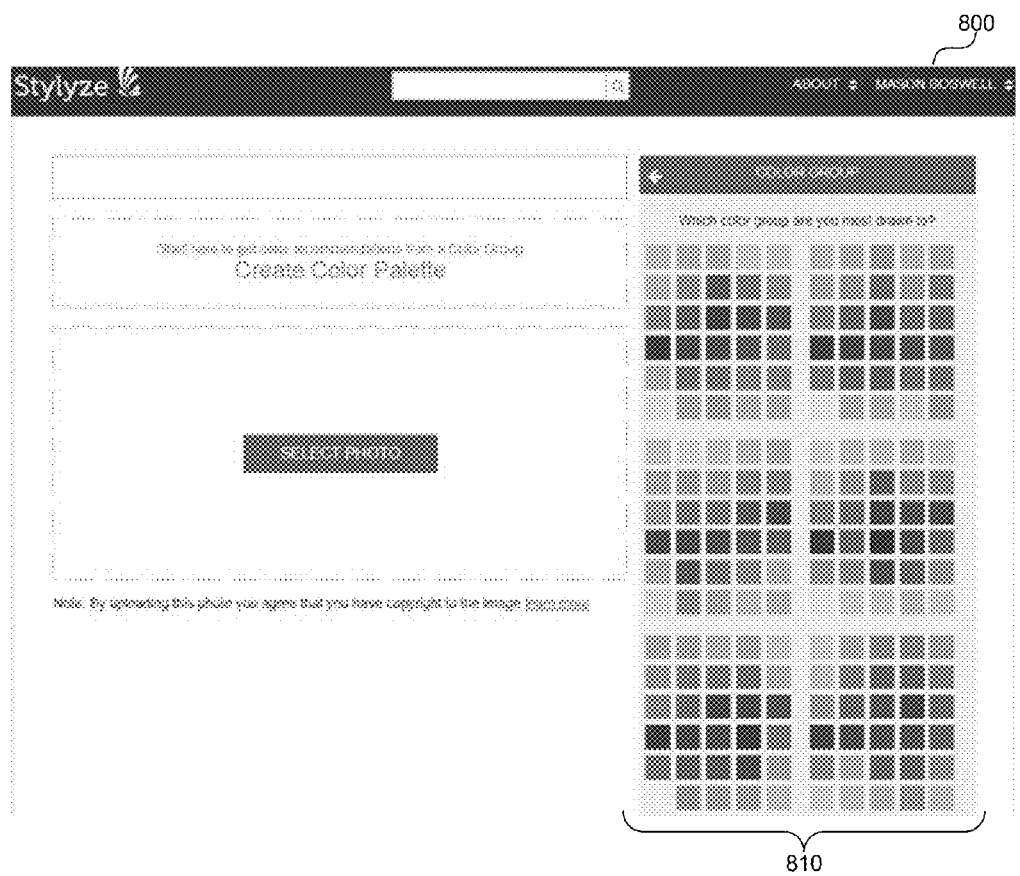
FIG. 8 is a display diagram that illustrates an interface of the color selection system for creating a new styleboard by the selection of color groups, in one embodiment.

FIG. 8 is a display diagram that illustrates an interface of the color selection system for creating a new styleboard by the selection of color groups, in one embodiment. FIG. 8 is similar to FIG. 7, but the display 800 includes a grid 810 of color groups from which the user can select. The color groups may be chosen by the system or may be based on input from the user, such as a photo, product selection, color, or other choice.

Figure 9:
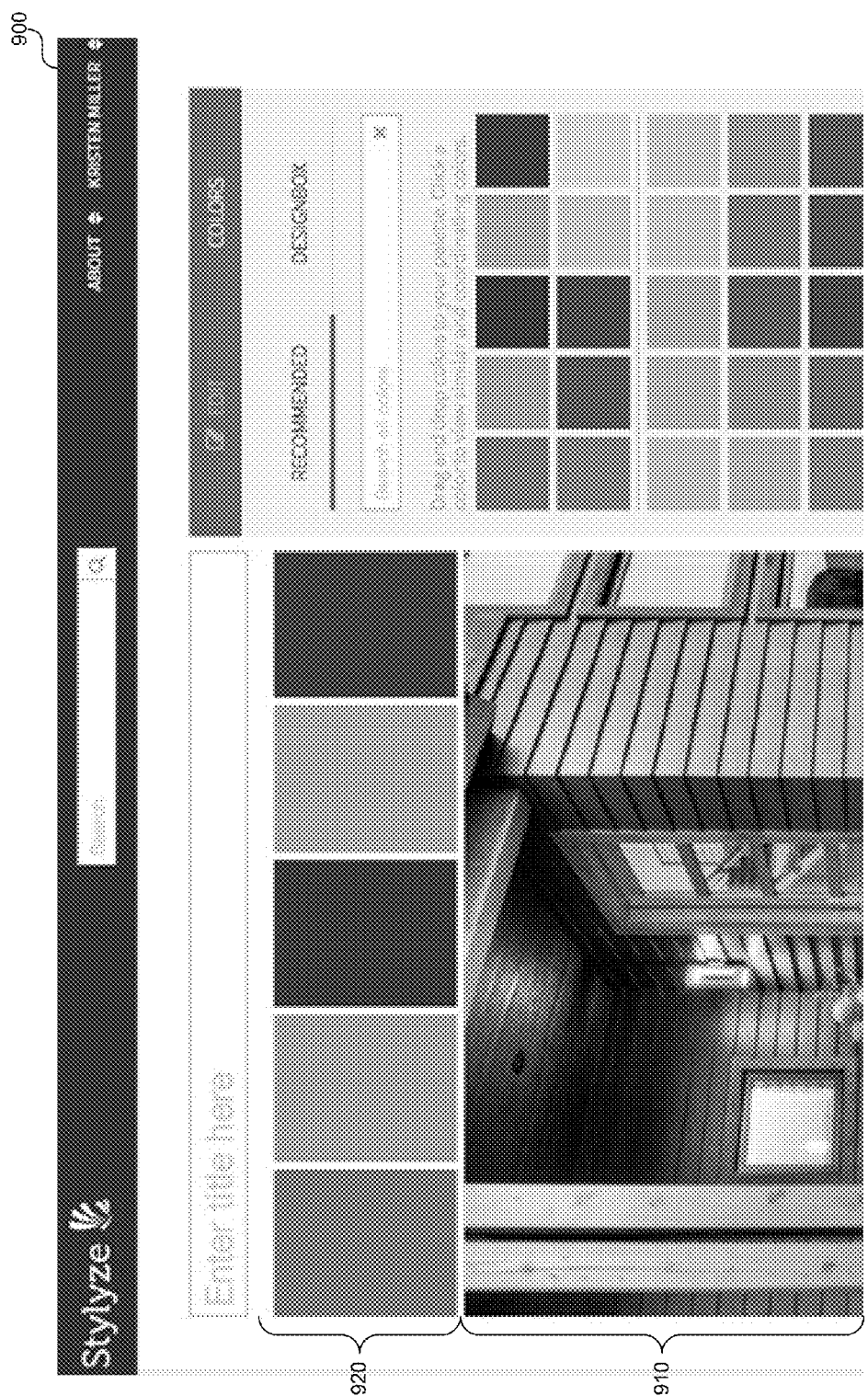
FIG. 9 is a display diagram that illustrates an interface of the color selection system for starting a styleboard from an uploaded digital image, in one embodiment.

FIG. 9 is a display diagram that illustrates an interface of the color selection system for starting a styleboard from an uploaded digital image, in one embodiment. The display 900 includes an uploaded image 910 and coordinating colors 920 determined by the system. The user uploaded an image 910 relevant to the user, perhaps from the user's home, from a product website, or from any other source. In response, the system determined a set of recommended coordinating colors 920. The user can select additional colors or change the colors to complete the styleboard. When the user is satisfied with the styleboard, the user can share/publish the styleboard or save it to the user's profile.

Figure 10:
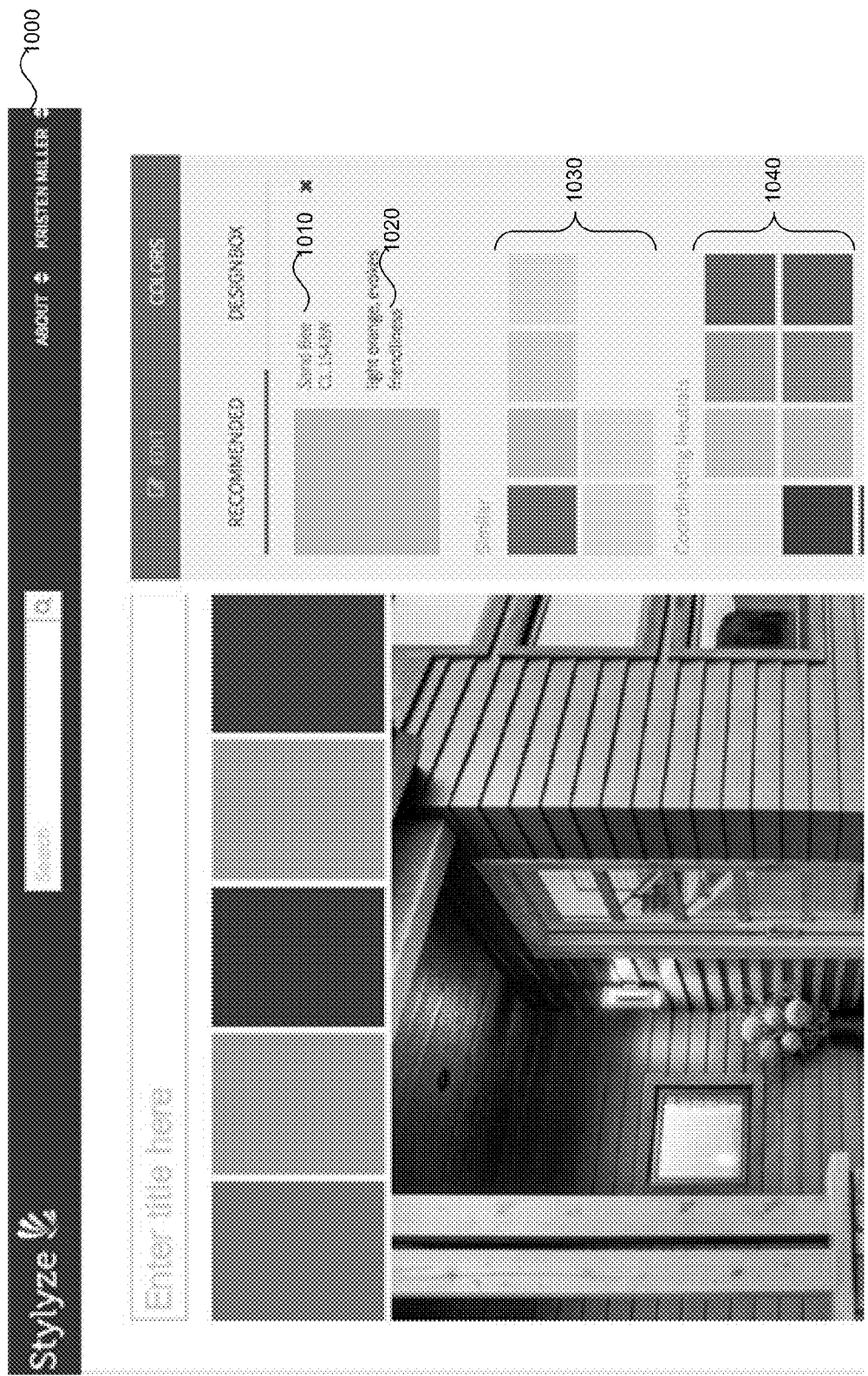
FIG. 10 is a display diagram that illustrates an interface of the color selection system for viewing detail information about a particular color, in one embodiment.

FIG. 10 is a display diagram that illustrates an interface of the color selection system for viewing detail information about a particular color, in one embodiment. In the example display 1000, the user has selected one of the colors from the top of the styleboard. In response, the system displays information about the color, such as the color's name and paint code 1010, a description of the color 1020, similar colors 1030, and coordinating neutrals 1040. The user can use this information to purchase paint in the selected color or to find other related colors. The user might add related colors to the styleboard or create new styleboards based on the related colors. In some embodiments, the user can find products by initiating a search based on one or more selected colors.

Figure 11:
FIG. 11 is a display diagram that illustrates an interface of the color selection system for displaying a styleboard workspace, in one embodiment.

FIG. 11 is a display diagram that illustrates an interface of the color selection system for displaying a styleboard workspace, in one embodiment. The styleboard workspace provides the ultimate shopping experience for colorful products. Inspiring and relevant products are intelligently recommended through a user interface that is easy, fun, and functional. The result is that the user can confidently make color-related purchasing decisions. The display 1100 includes a designbox tab 1110 from which the user can select items to include in the styleboard 1130. The designbox tab 1110 displays a list or grid of items 1120 that may include products, colors, photos, or other items related to color. The styleboard 1130 includes multiple previously selected items, a coordinating set of colors, and an area 1140 for adding additional items to the styleboard 1130.

Figure 12:
FIG. 12 is a display diagram that illustrates an interface of the color selection system for searching based on color, in one embodiment.

FIG. 12 is a display diagram that illustrates an interface of the color selection system for searching based on color, in one embodiment. The search interface provides complete product discovery. The user can search by specific or recommended colors and tags. The user can view results as styleboards, colors, products, or photos. The search interface is designed to provide more relevant, engaging, and targeted results. The display 1200 provides a search box 1210 in which the user can enter keywords or tags that will refine the search. The display also includes a list of tags 1220 previously entered by the user as well as a color picker 1230 that the user can use to narrow the search based on color. The results are displayed in a categorized view 1250 such that the user can select from the type bar 1240 to limit results to a particular type (e.g., styleboards, colors, photos, or products). In this way, the user can quickly get from an initial idea about color to real results related to that color.

Figure 13:
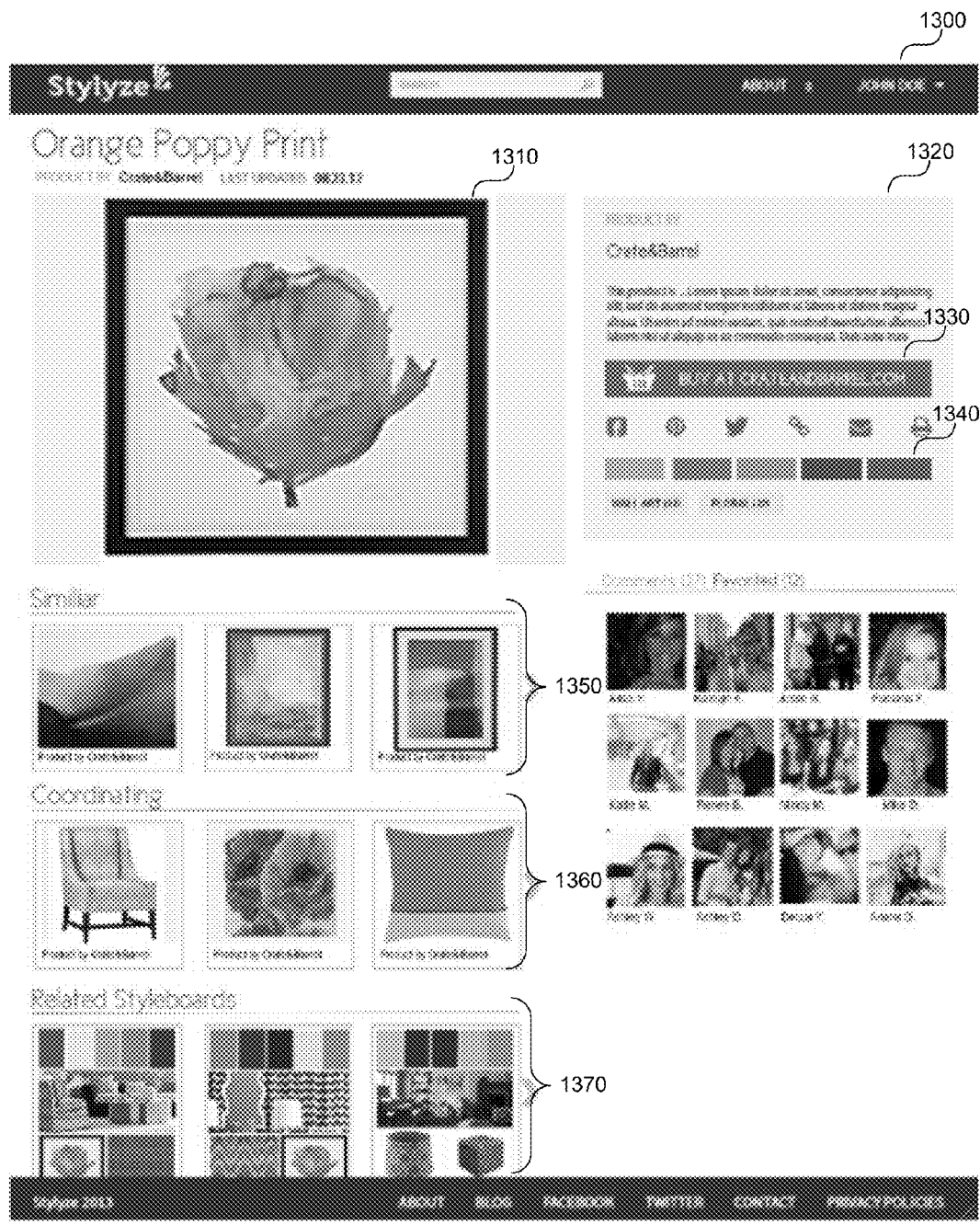
FIG. 13 is a display diagram that illustrates an interface of the color selection system for displaying a product detail page, in one embodiment.

FIG. 13 is a display diagram that illustrates an interface of the color selection system for displaying a product detail page, in one embodiment. The product detail page incorporates elements of the system to provide context and relevancy to the user with an arsenal of connected results. The display 1300 includes a product image 1310, product detail information 1320, similar products 1350, coordinating products 1360, and related styleboards 1370. The product detail information 1320 includes a link or other control 1330 for purchasing the displayed product and related colors 1340 that are evoked by the product. The related colors 1340 are also search tags that may be used to launch a search on that specific color. The similar products 1350 and coordinating products 1360 allow the user to see other products the user might be interested in. The related styleboards 1370 allow the user to see complete design packages produced by other users or the product retailer that the user might be interested in.

Figure 14:
FIG. 14 is a display diagram that illustrates an interface of the color selection system for displaying a company page, in one embodiment.

FIG. 14 is a display diagram that illustrates an interface of the color selection system for displaying a company page, in one embodiment. A company page allows a retailer or other company to create a virtual design Studio where users can "walk in and browse" a company's curated collection of products, styleboards, colors, and photos; and consequently design with them and purchase. Companies can feature their design studio on their own website via the APIs exposed by the system. The display 1400 includes company information 1410, a search area 1420, and a list of related results 1430. Users can browse the company's products or use the search area 1420 to identify specific products based on keywords or other information. In response, the system displays related results 1430, which may include styleboards, colors, photos, products, and so forth.

Figure 15:
FIG. 15 is a display diagram that illustrates an interface of the color selection system for integrating styleboard information with a third party website, in one embodiment.

FIG. 15 is a display diagram that illustrates an interface of the color selection system for integrating styleboard information with a third party website, in one embodiment. The display 1500 shows a typical product detail page of Amazon.com, which has been updated to include a list of styleboards 1510 related to the currently displayed item. Each of the styleboards may contain the item and/or related colors and other products.

Figure 16:
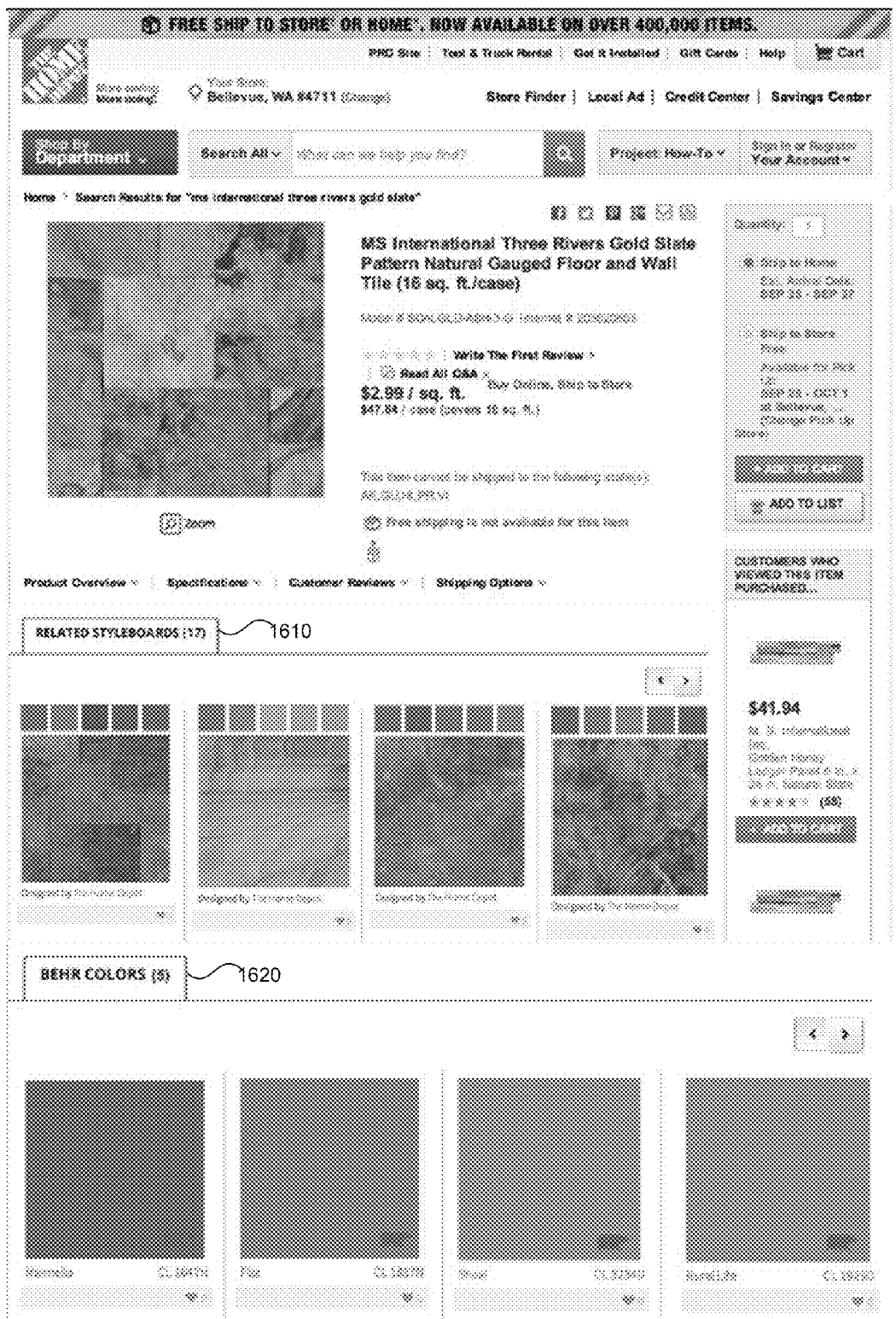
FIG. 16 is a display diagram that illustrates an interface of the color selection system with another example of integrating the system with a third party website, in one embodiment.

FIG. 16 is a display diagram that illustrates an interface of the color selection system with another example of integrating the system with a third party website, in one embodiment. The display shows a typical product detail page of home improvement store Home Depot, which has been updated to include a list of related styleboards 1610, and a list of Behr paint colors 1620 related to the currently displayed item. The system can use the image analysis techniques described herein to pull colors from the product image and find related styleboards and paint colors.

CONCLUSION

From the foregoing, it will be appreciated that specific embodiments of the color selection system have been described herein for purposes of illustration, but that various modifications may be made without deviating from the spirit and scope of the invention. Accordingly, the invention is not limited except as by the appended claims.

We claim:

1. A computer-implemented method to find and coordinate products based on color, the method comprising:
classifying colors into coordinating harmonious groups, each color group comprising coordinating colors of a plurality of different hue families;
receiving images of products;
storing product identifiers of the products in a database of products;
creating a color index for the database of products, the creating comprising performing, without user input, for each of the received images of products:
determining a color palette that is most representative of the received image of the product;
selecting a color group from the coordinating harmonious color groups that is most representative of the received image of the product;
mapping the determined color palette to the closest colors in the color group to generate a harmonious color palette for the received image of the product;
storing colors of the harmonious color palette of the product in the database of products; and
creating an entry in the color index that includes at least a subset of the colors of the harmonious color palette of the product;
building, without user input, new content that includes a plurality of styleboards that each include at least two of the received images of products, the building based at least in part on the color index;
displaying one or more of the styleboards to a user;
providing the user with tools to modify the one or more styleboards;
receiving a modification to one of the styleboards from the user;
updating the styleboard based on the modification; and
displaying the updated styleboard to the user,
wherein the tools are located on a mobile device of the user and the receiving the modification is from the mobile device of the user via network and the modification is a new image to be added to the styleboard, the new image captured by an image capturing device located on the mobile device.

2. The method of claim 1, wherein the database of products includes a product identifier index and the storing product identifiers of the products in a database of products includes creating an entry in the product identifier index.

3. The method of claim 1, wherein the tools to modify the one or more styleboards include tools for the user to perform at least a subset of adding an image to the styleboard, removing an image from the styleboard, copying the styleboard to an other styleboard, and sending the styleboard to an other user or social media website.

4. The method of claim 1, wherein the images of products are received from an online catalog that is indexed based by product type.

5. The method of claim 1, further comprising providing the user with tools to purchase one or more products having images in the styleboard.

6. The method of claim 1, wherein the products include apparel products.

7. The method of claim 1, wherein the products include home products.

8. The method of claim 1, wherein the products include interior design products.

9. The method of claim 1, wherein the products include home improvement products.

10. The method of claim 1, wherein the plurality of styleboards are indexed by color.

11. A system for finding and coordinating products based on color, the system comprising:
- a memory having computer readable instructions; and
- one or more processors for executing the computer readable instructions, the computer readable instructions comprising:
- classifying colors into coordinating harmonious groups, each color group comprising coordinating colors of a plurality of different hue families;
- receiving images of products;
- storing product identifiers of the products in a database of products;
- creating a color index for the database of products, the creating comprising performing, without user input, for each of the received images of products:
  - determining a color palette that is most representative of the received image of the product;
  - selecting a color group from the coordinating harmonious color groups that is most representative of the received image of the product;
  - mapping the determined color palette to the closest colors in the color group to generate a harmonious color palette for the received image of the product;
  - storing colors of the harmonious color palette of the product in the database of products; and
  - creating an entry in the color index that includes at least a subset of the colors of the harmonious color palette of the product;
- building, without user input, new content that includes a plurality of styleboards that each include at least two of the received images of products, the building based at least in part on the color index;
- displaying one or more of the styleboards to a user;
- providing the user with tools to modify the one or more styleboards;
- receiving a modification to one of the styleboards from the user;
- updating the styleboard based on the modification; and
- displaying the updated styleboard to the user,
- wherein the tools are located on a mobile device of the user and the receiving the modification is from the mobile device of the user via network and the modification is a new image to be added to the styleboard, the new image captured by an image capturing device located on the mobile device.

12. The system of claim 11, wherein the database of products includes a product identifier index and the storing product identifiers of the products in a database of products includes creating an entry in the product identifier index.

13. The system of claim 11, wherein the images of products are received from an online catalog that is indexed based by product type.

14. A computer program product for finding and coordinating products based on color, the computer program product comprising:
- a non-transitory computer readable storage medium having program instructions embodied therewith, the program instructions executable by a processor to cause the processor to perform:
- classifying colors into coordinating harmonious groups, each color group comprising coordinating colors of a plurality of different hue families;
- receiving images of products;
- storing product identifiers of the products in a database of products;
- creating a color index for the database of products, the creating comprising performing, without user input, for each of the received images of products:
  - determining a color palette that is most representative of the received image of the product;
  - selecting a color group from the coordinating harmonious color groups that is most representative of the received image of the product;
  - mapping the determined color palette to the closest colors in the color group to generate a harmonious color palette for the received image of the product;
  - storing colors of the harmonious color palette of the product in the database of products; and
  - creating an entry in the color index that includes at least a subset of the colors of the harmonious color palette of the product;
- building, without user input, new content that includes a plurality of styleboards that each includes at least two of the received images of products, the building based at least in part on the color index;
- displaying one or more of the styleboards to a user;
- providing the user with tools to modify the one or more styleboards;
- receiving a modification to one of the styleboards from the user;
- updating the styleboard based on the modification; and
- displaying the updated styleboard to the user,
- wherein the tools are located on a mobile device of the user and the receiving the modification is from the mobile device of the user via network and the modification is a new image to be added to the styleboard, the new image captured by an image capturing device located on the mobile device.

\* \* \* \* \*